United States Patent
Ishii et al.

(10) Patent No.: US 10,837,903 B2
(45) Date of Patent: Nov. 17, 2020

(54) INFORMATION PROCESSING APPARATUS, METHOD OF DERIVING REFLECTION CHARACTERISTICS, PROGRAM, AND REFLECTION CHARACTERISTIC PROFILE

(71) Applicant: CANON KABUSHIKI KAISHA, Tokyo (JP)

(72) Inventors: Toshiyuki Ishii, Tokyo (JP); Takahiro Suzuki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/094,518

(22) PCT Filed: Apr. 24, 2017

(86) PCT No.: PCT/JP2017/016143
§ 371 (c)(1),
(2) Date: Oct. 18, 2018

(87) PCT Pub. No.: WO2017/199691
PCT Pub. Date: Nov. 23, 2017

(65) Prior Publication Data
US 2019/0120764 A1    Apr. 25, 2019

(30) Foreign Application Priority Data
May 18, 2016  (JP) .................................. 2016-099821

(51) Int. Cl.
*G01N 21/57*    (2006.01)
*G01N 21/47*    (2006.01)
*G01N 21/55*    (2014.01)

(52) U.S. Cl.
CPC ......... *G01N 21/57* (2013.01); *G01N 21/4738* (2013.01); *G01N 21/55* (2013.01);
(Continued)

(58) Field of Classification Search
CPC .... G01N 21/57; G01N 21/55; G01N 21/4738; G01N 2021/555; G01N 2021/4704; G01N 2021/4735
See application file for complete search history.

(56) References Cited

U.S. PATENT DOCUMENTS 3,986,160 A * 10/1976 Turner ................ G01S 15/8968
367/7
5,521,657 A * 5/1996 Klopotek ............... A61B 3/107
351/212
(Continued)

FOREIGN PATENT DOCUMENTS

JP    H08-039841 A    2/1996
JP    2003-145733 A    5/2003
(Continued)

OTHER PUBLICATIONS

Aug. 2, 2017 International Search Report and Written Opinion in International Patent Appln. No. PCT/JP2017/016143.
(Continued)

*Primary Examiner* — Sang H Nguyen
(74) *Attorney, Agent, or Firm* — Venable LLP

(57) ABSTRACT

To provide a technique of obtaining the reflection characteristics of an object, which can reproduce the appearance of the object more correctly, an information processing apparatus obtains a plurality of measurement values by receiving, from each of a plurality of directions, reflected light from an object illuminated by light from a given direction, and derives, based on the plurality of measurement values, a characteristic of specular reflection light as a reflected light component in a specular reflection direction corresponding to the given direction with respect to a surface of the object, a characteristic of internal diffuse reflection light as a reflected light component after scattering and absorption in
(Continued)

the object, and a characteristic of surface diffuse reflection light as a reflected light component which has been diffused on the surface of the object.

7 Claims, 26 Drawing Sheets

(52) U.S. Cl.
CPC .......... *G01N 2021/4704* (2013.01); *G01N 2021/4735* (2013.01); *G01N 2021/555* (2013.01)

(56) References Cited

U.S. PATENT DOCUMENTS

| | | | |
|---|---|---|---|
| 5,835,116 A | 11/1998 | Sato et al. | |
| 6,166,814 A * | 12/2000 | Pringle | G01J 3/0251 356/445 |
| 6,222,970 B1 | 4/2001 | Wach et al. | |
| 6,370,406 B1 | 4/2002 | Wach et al. | |
| 6,439,708 B1 | 8/2002 | Kato et al. | |
| 6,443,568 B1 | 9/2002 | Askeland et al. | |
| 6,733,105 B2 | 5/2004 | Tatsumi | |
| 7,221,445 B2 | 5/2007 | Earthman et al. | |
| 8,314,971 B2 | 11/2012 | Nishiyama | |
| 8,611,674 B1 | 12/2013 | Beeler et al. | |
| 8,632,146 B2 | 1/2014 | Yoshida | |
| 8,851,658 B2 | 10/2014 | Yamamoto et al. | |
| 8,976,361 B2 | 3/2015 | Kato | |
| 9,103,717 B2 | 8/2015 | Oba et al. | |
| 9,222,882 B2 | 12/2015 | Hirabayashi et al. | |
| 9,266,352 B2 | 2/2016 | Liu et al. | |
| 2003/0090555 A1 | 5/2003 | Tatsumi | |
| 2004/0201660 A1 | 10/2004 | Nishikawa et al. | |
| 2006/0284929 A1 | 12/2006 | Matsuzawa et al. | |
| 2007/0047157 A1 * | 3/2007 | Miyahara | B41J 11/009 360/324.11 |
| 2008/0186390 A1 | 8/2008 | Sato et al. | |
| 2008/0317980 A1 * | 12/2008 | Yuba | B44C 1/10 428/29 |
| 2010/0284014 A1 * | 11/2010 | Baba | G01N 21/474 356/446 |
| 2011/0157272 A1 | 6/2011 | Ikehata et al. | |
| 2012/0057145 A1 * | 3/2012 | Tunnell | G01N 21/31 356/51 |
| 2012/0140233 A1 * | 6/2012 | Rockwell | G01N 21/55 356/445 |
| 2013/0057608 A1 | 3/2013 | Yamamoto et al. | |
| 2013/0216245 A1 | 8/2013 | Hoshi et al. | |
| 2013/0228674 A1 | 9/2013 | Oba et al. | |
| 2014/0329172 A1 | 11/2014 | Hart et al. | |
| 2015/0116835 A1 * | 4/2015 | Ogumi | G02F 1/133502 359/601 |
| 2016/0109364 A1 | 4/2016 | Ohba et al. | |
| 2016/0267348 A1 * | 9/2016 | Kondo | G06K 9/2036 |
| 2016/0377540 A1 | 12/2016 | Ohba et al. | |
| 2017/0316758 A1 * | 11/2017 | Atkins | G09G 3/3413 |
| 2019/0094141 A1 | 3/2019 | Suzuki et al. | |

FOREIGN PATENT DOCUMENTS

| | | |
|---|---|---|
| JP | 2012-044421 A | 3/2012 |
| JP | 2012-208103 A | 10/2012 |
| JP | 2013-181797 A | 9/2013 |
| JP | 2017-020870 A | 1/2017 |
| WO | 2007/139067 A1 | 12/2007 |
| WO | 2011/142448 A1 | 11/2011 |

OTHER PUBLICATIONS

Yanxiang Lan, et al., "Bi-Scale Appearance Fabrication", ACM Transactions on Graphics (TOG)—Siggraph 2013 Conference Proceedings TOG Homepage Archive, vol. 32, Issue 4, Jul. 2013.
Office Action in Japanese Patent Application No. 2016-099821, dated Aug. 3, 2020.

* cited by examiner

[Fig. 1A]
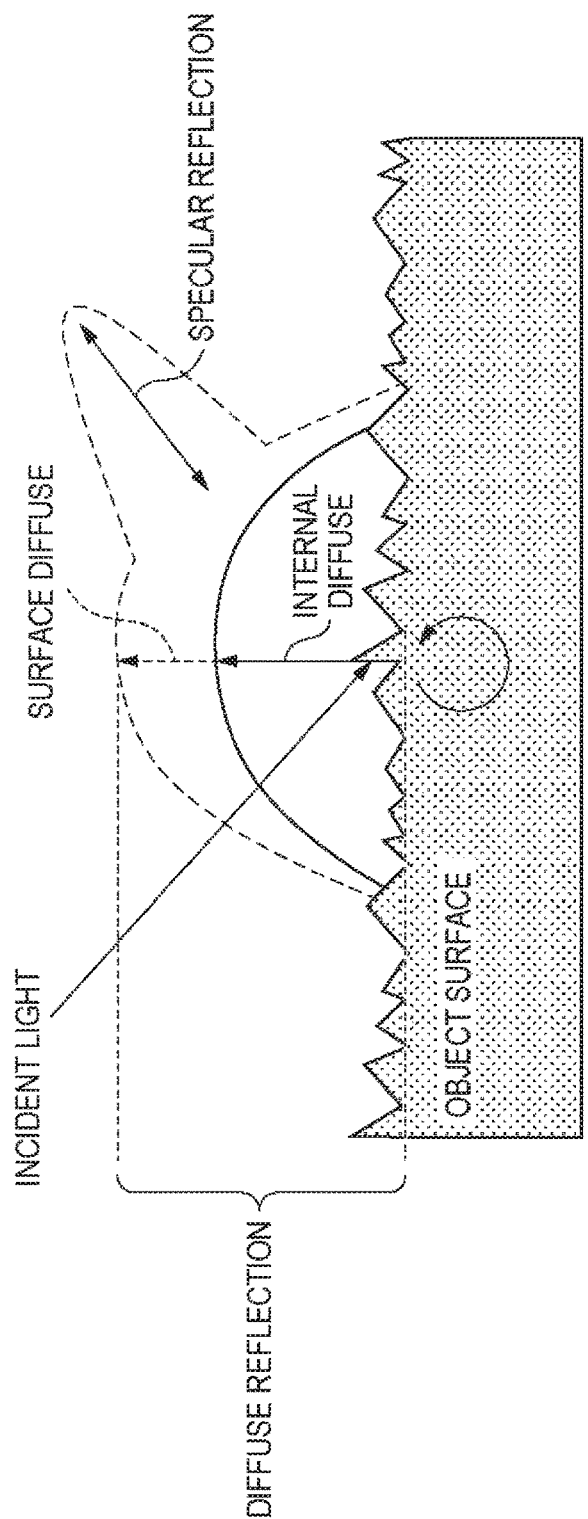

[Fig. 1B]
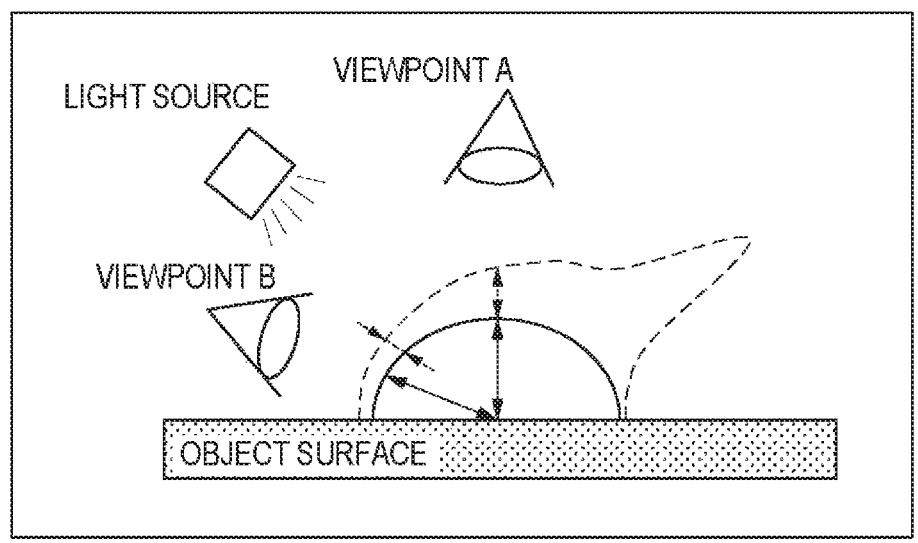

[Fig. 2]
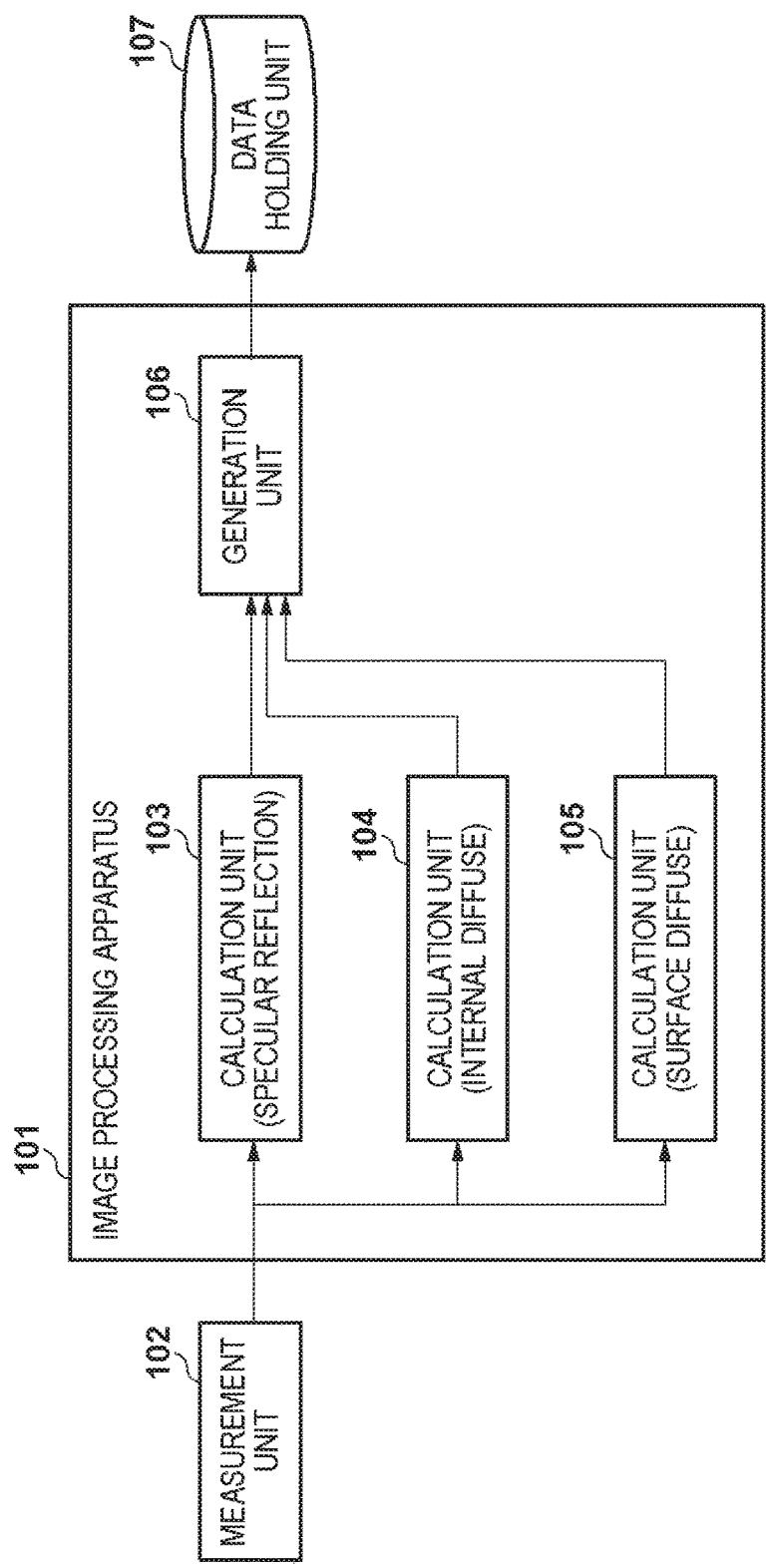

[Fig. 3]
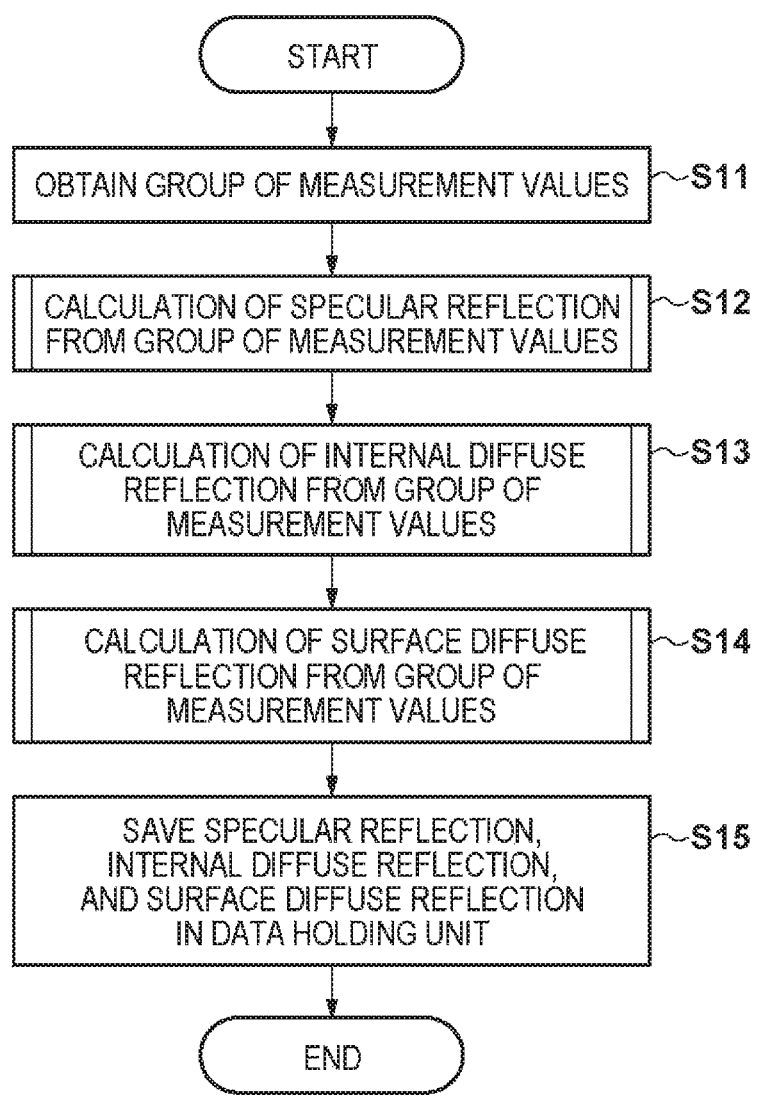

[Fig. 4A]
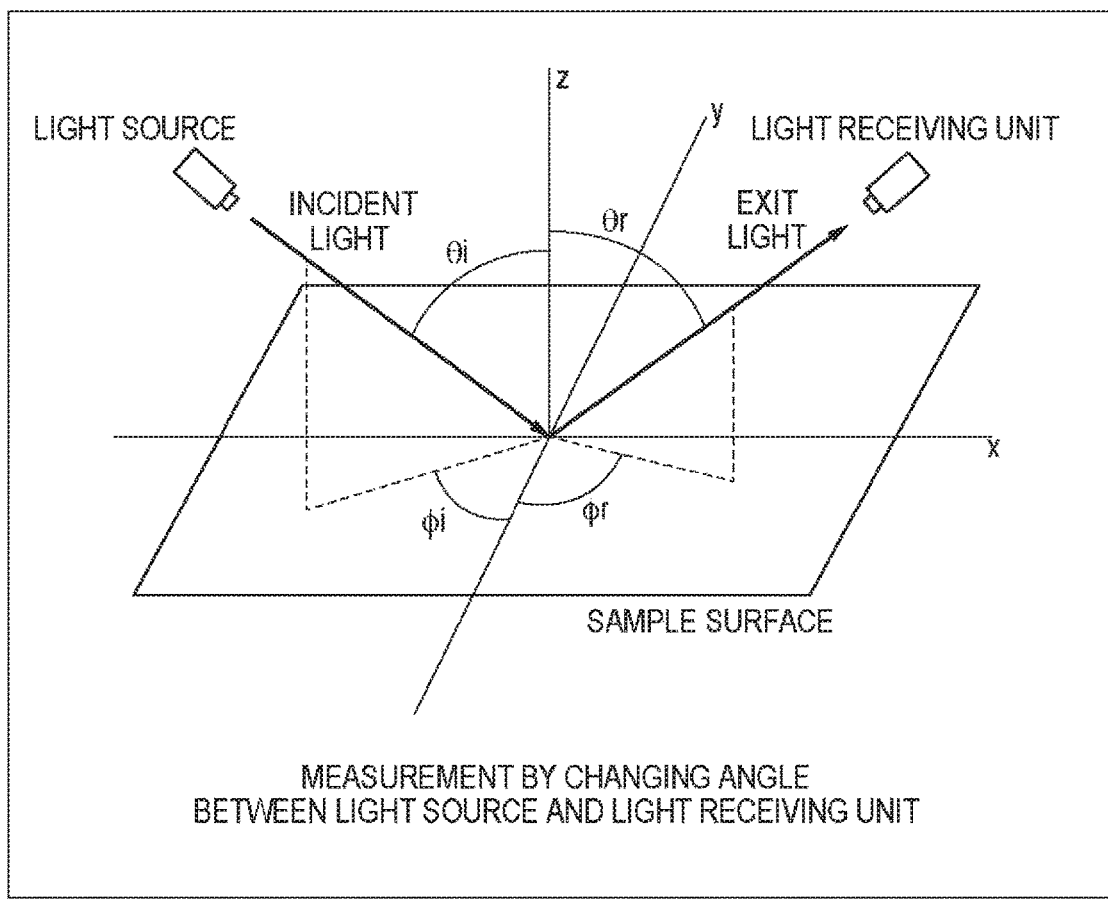

[Fig. 4B]
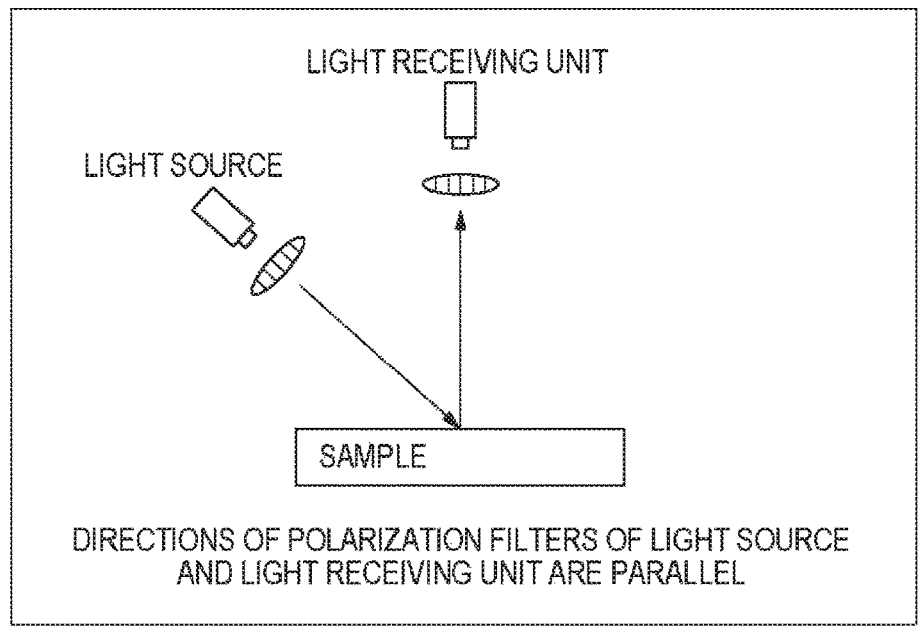
[Fig. 4C]
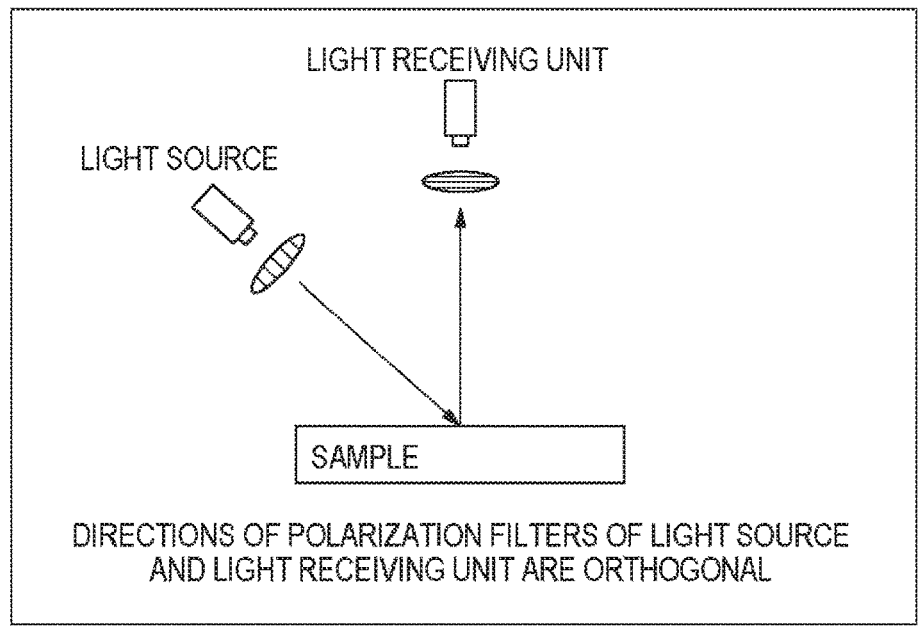

[Fig. 5]

| MEASURE-MENT ID | INCIDENT ELEVATION ANGLE (θ) | LIGHT RECEIVING ELEVATION ANGLE (θr) | INCIDENT AZIMUTH (φ) | LIGHT RECEIVING AZIMUTH (φr) | XYZ (PARALLEL) | X'Y'Z' (ORTHOGONAL) |
|---|---|---|---|---|---|---|
| A-1 | 45 | -60 | 0 | 0 | (X1,Y1,Z1) | (X1',Y1',Z1') |
| A-2 | 45 | -55 | 0 | 0 | (X2,Y2,Z2) | (X2',Y2',Z2') |
| A-3 | 45 | -50 | 0 | 0 | (X3,Y3,Z3) | (X3',Y3',Z3') |
| A-4 | 45 | -45 | 0 | 0 | (X4,Y4,Z4) | (X4',Y4',Z4') |
| A-5 | 45 | -40 | 0 | 0 | (X5,Y5,Z5) | (X5',Y5',Z5') |
| A-6 | 45 | -35 | 0 | 0 | (X6,Y6,Z6) | (X6',Y6',Z6') |
| A-7 | 45 | -30 | 0 | 0 | (X7,Y7,Z7) | (X7',Y7',Z7') |
| A-8 | 45 | -25 | 0 | 0 | (X8,Y8,Z8) | (X8',Y8',Z8') |
| A-9 | 45 | -20 | 0 | 0 | (X9,Y9,Z9) | (X9',Y9',Z9') |
| A-10 | 45 | -15 | 0 | 0 | (X10,Y10,Z10) | (X10',Y10',Z10') |
| A-11 | 45 | -10 | 0 | 0 | (X11,Y11,Z11) | (X11',Y11',Z11') |
| A-12 | 45 | -5 | 0 | 0 | (X12,Y12,Z12) | (X12',Y12',Z12') |
| A-13 | 45 | 0 | 0 | 0 | (X13,Y13,Z13) | (X13',Y13',Z13') |
| A-14 | 45 | 5 | 0 | 0 | (X14,Y14,Z14) | (X14',Y14',Z14') |
| A-15 | 45 | 10 | 0 | 0 | (X15,Y15,Z15) | (X15',Y15',Z15') |
| A-16 | 45 | 15 | 0 | 0 | (X16,Y16,Z16) | (X16',Y16',Z16') |
| A-17 | 45 | 20 | 0 | 0 | (X17,Y17,Z17) | (X17',Y17',Z17') |
| A-18 | 45 | 25 | 0 | 0 | (X18,Y18,Z18) | (X18',Y18',Z18') |
| A-19 | 45 | 30 | 0 | 0 | (X19,Y19,Z19) | (X19',Y19',Z19') |
| A-20 | 45 | 35 | 0 | 0 | (X20,Y20,Z20) | (X20',Y20',Z20') |
| A-21 | 45 | 40 | 0 | 0 | (X21,Y21,Z21) | (X21',Y21',Z21') |
| A-22 | 45 | 45 | 0 | 0 | (X22,Y22,Z22) | (X22',Y22',Z22') |
| A-23 | 45 | 50 | 0 | 0 | (X23,Y23,Z23) | (X23',Y23',Z23') |
| A-24 | 45 | 55 | 0 | 0 | (X24,Y24,Z24) | (X24',Y24',Z24') |
| A-25 | 45 | 60 | 0 | 0 | (X25,Y25,Z25) | (X25',Y25',Z25') |
| A-26 | 45 | -60 | 0 | 30 | (X26,Y26,Z26) | (X26',Y26',Z26') |
| A-27 | 45 | -55 | 0 | 30 | (X27,Y27,Z27) | (X27',Y27',Z27') |
| ... | ... | ... | ... | ... | ... | ... |

[Fig. 6]
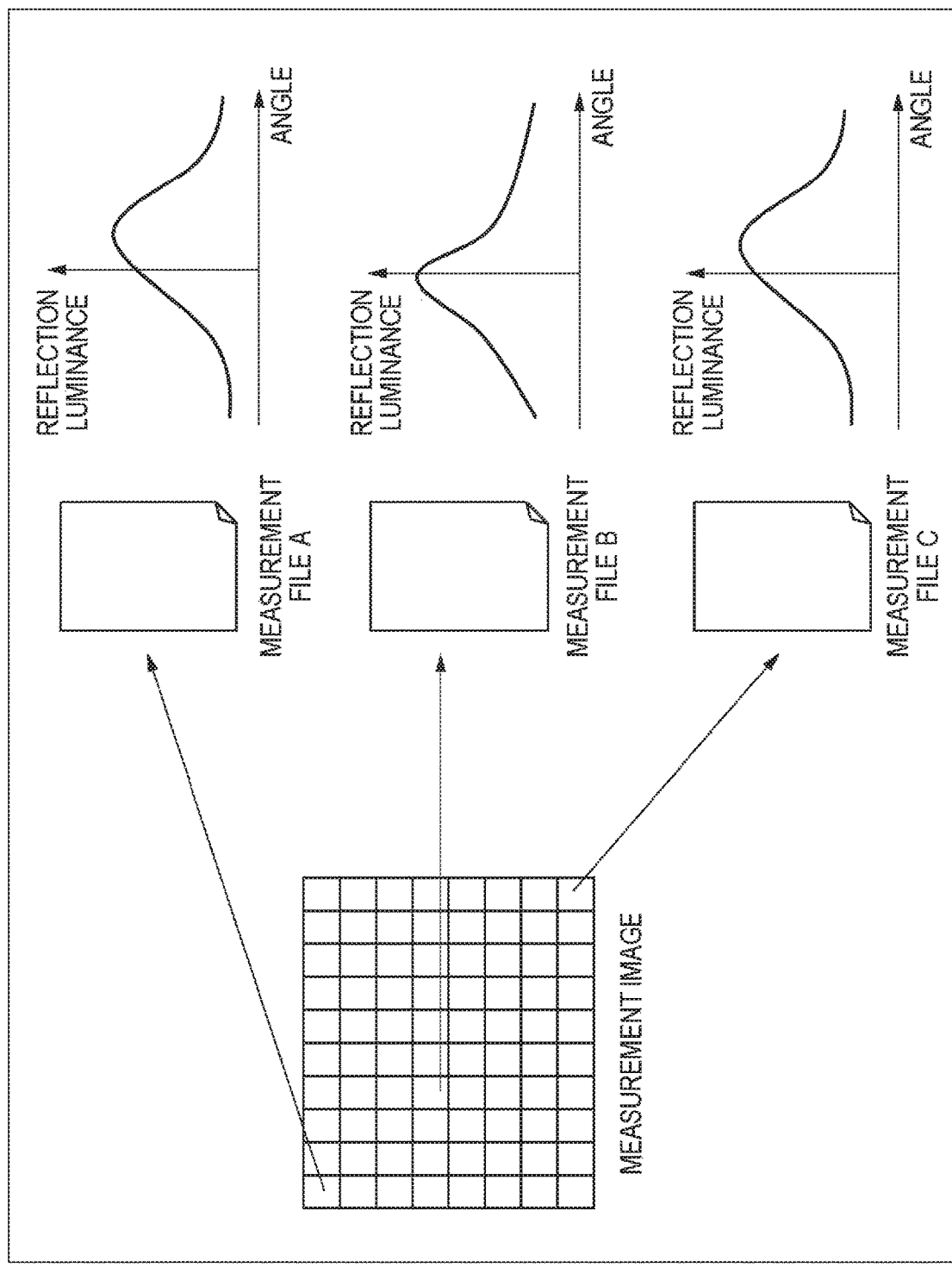

[Fig. 7]
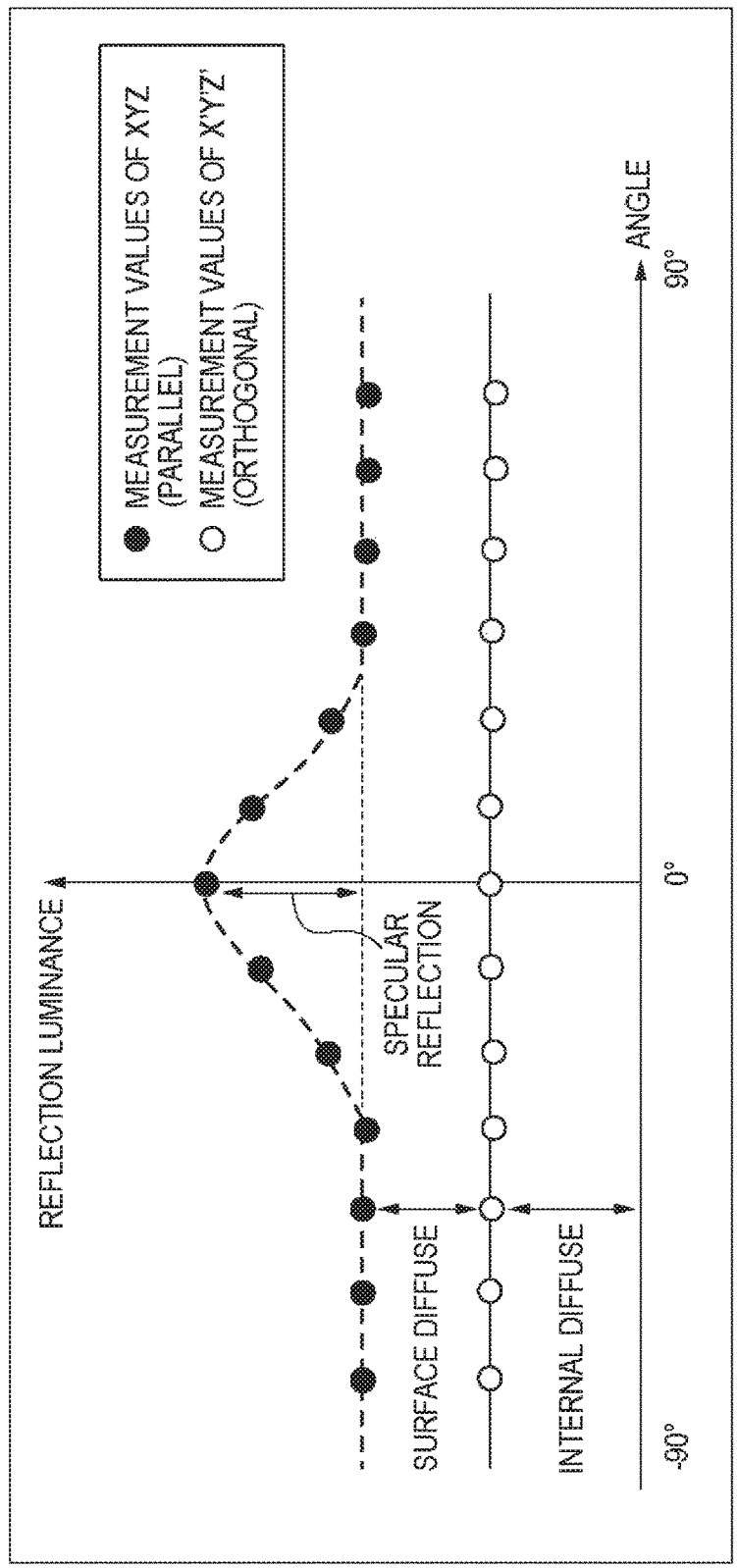

[Fig. 8]
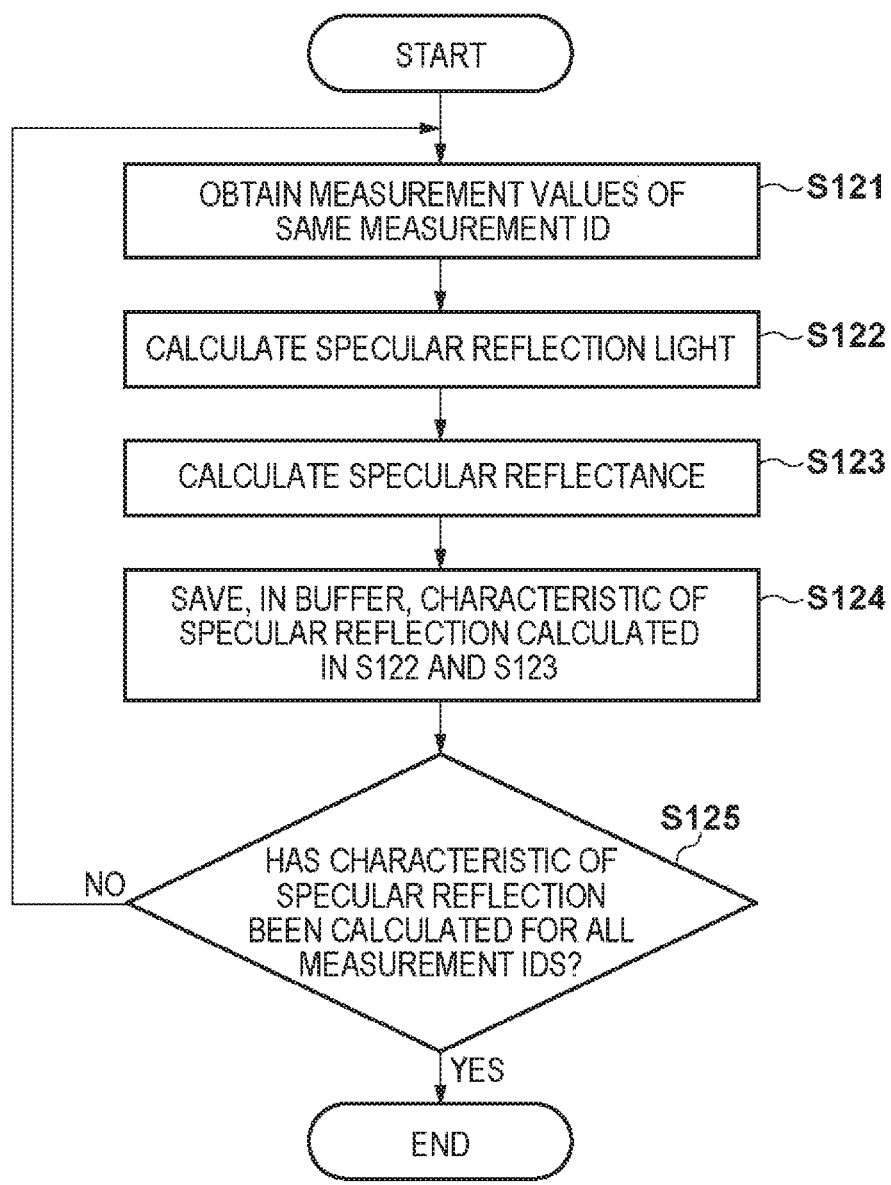

[Fig. 9]
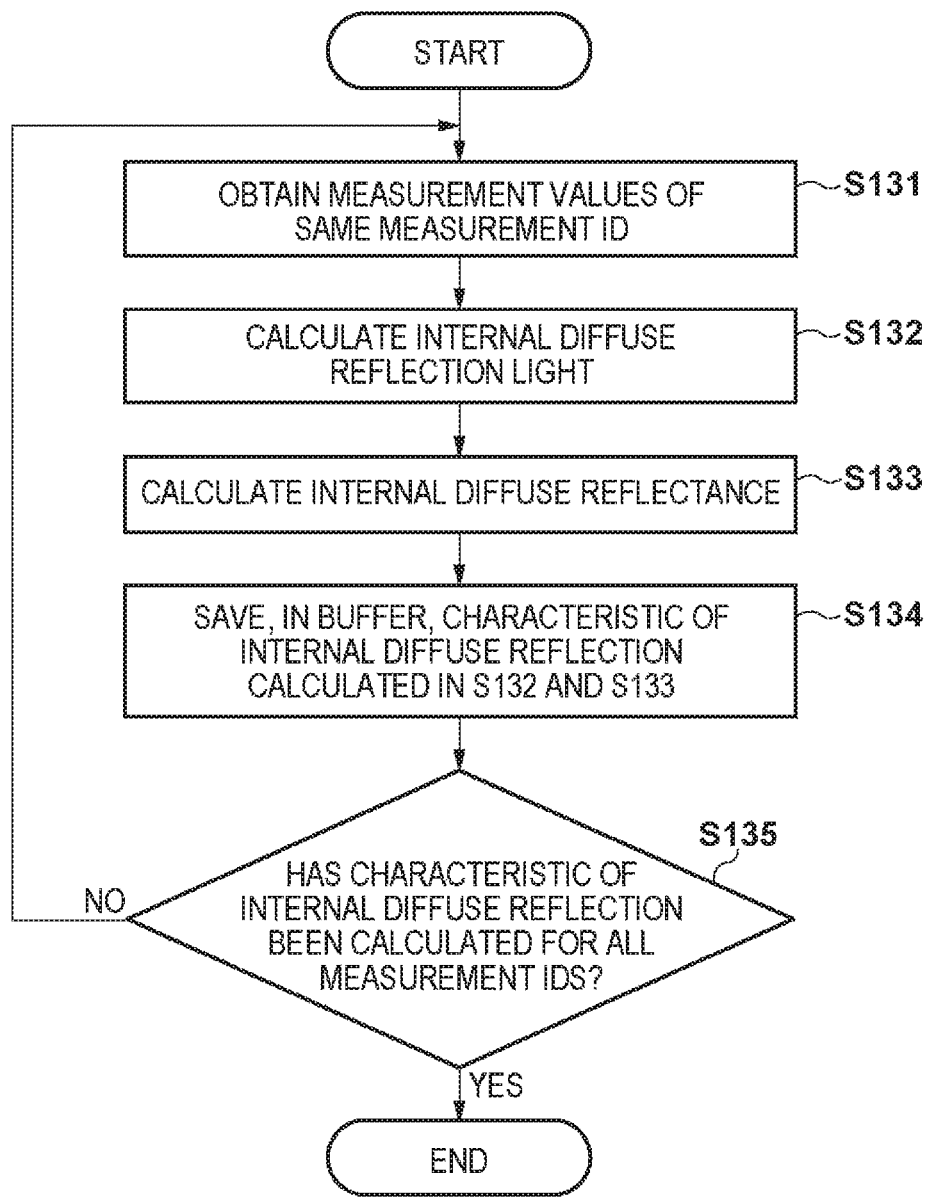

[Fig. 10]
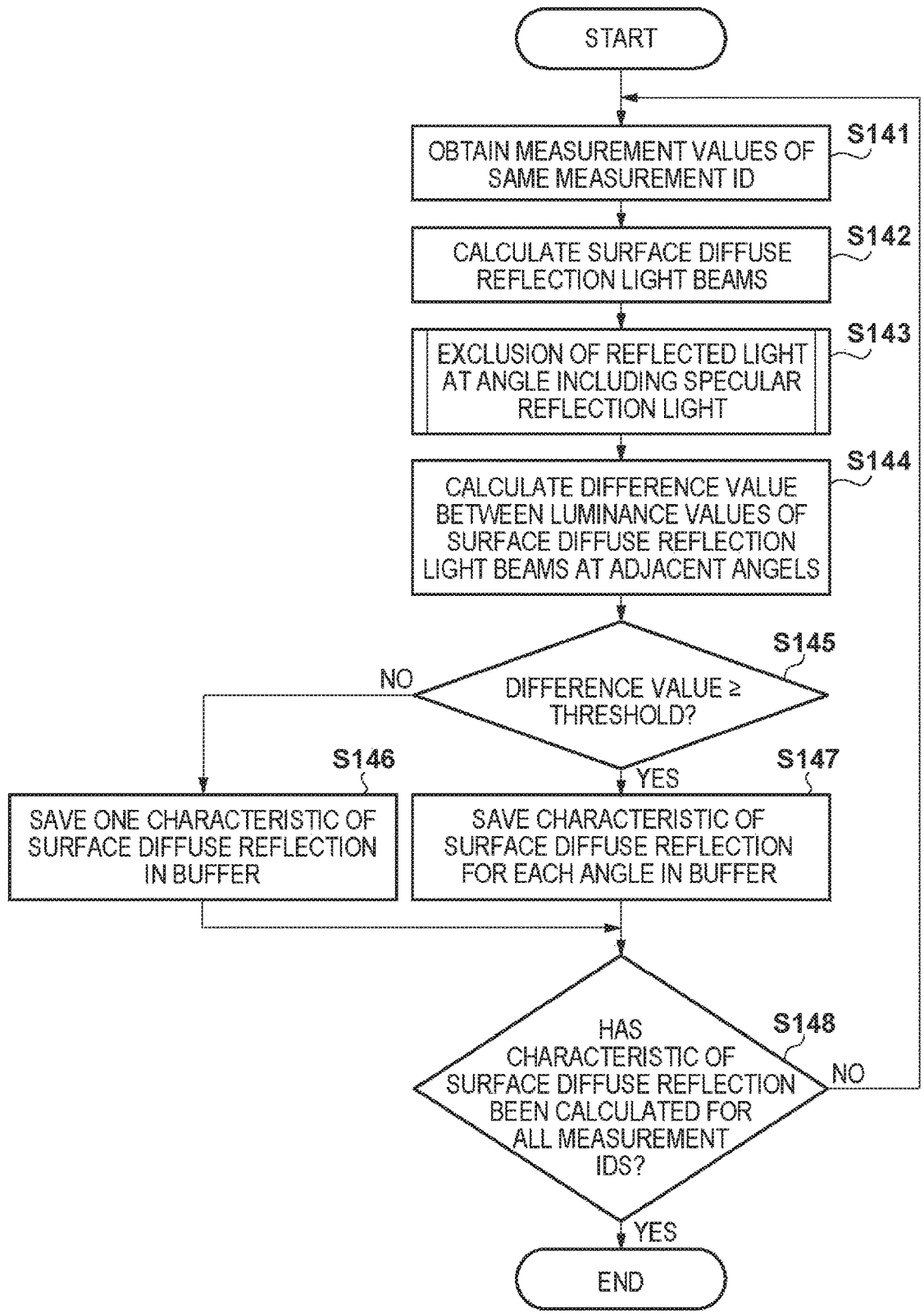

[Fig. 11]
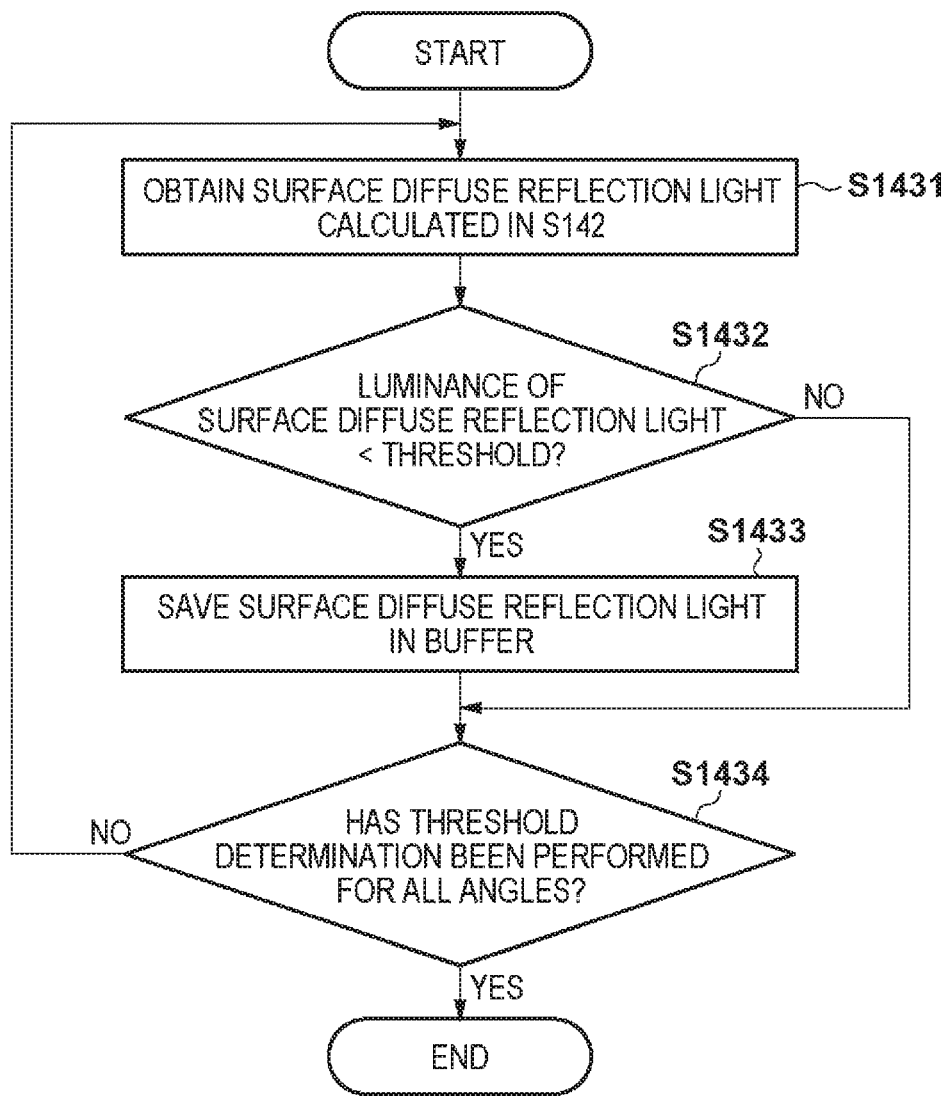

[Fig. 12]

| LIGHT SOURCED : D50 | |
|---|---|
| 1 | SPECULAR REFLECTION LIGHT: $Xs_1, Ys_1, Zs_1$<br>INTERNAL DIFFUSE REFLECTION LIGHT : $Xi_1, Yi_1, Zi_1$<br><br>SURFACE DIFFUSE REFLECTION LIGHT (0°) : $Xl_{11}, Yl_{11}, Zl_{11}$<br>SURFACE DIFFUSE REFLECTION LIGHT (10°) : $Xl_{12}, Yl_{12}, Zl_{12}$<br>SURFACE DIFFUSE REFLECTION LIGHT (20°) : $Xl_{13}, Yl_{13}, Zl_{13}$<br>SURFACE DIFFUSE REFLECTION LIGHT (30°) : $Xl_{14}, Yl_{14}, Zl_{14}$<br>SURFACE DIFFUSE REFLECTION LIGHT (40°) : $Xl_{15}, Yl_{15}, Zl_{15}$<br>SURFACE DIFFUSE REFLECTION LIGHT (50°) : $Xl_{16}, Yl_{16}, Zl_{16}$<br>SURFACE DIFFUSE REFLECTION LIGHT (60°) : $Xl_{17}, Yl_{17}, Zl_{17}$ |

[Fig. 13]
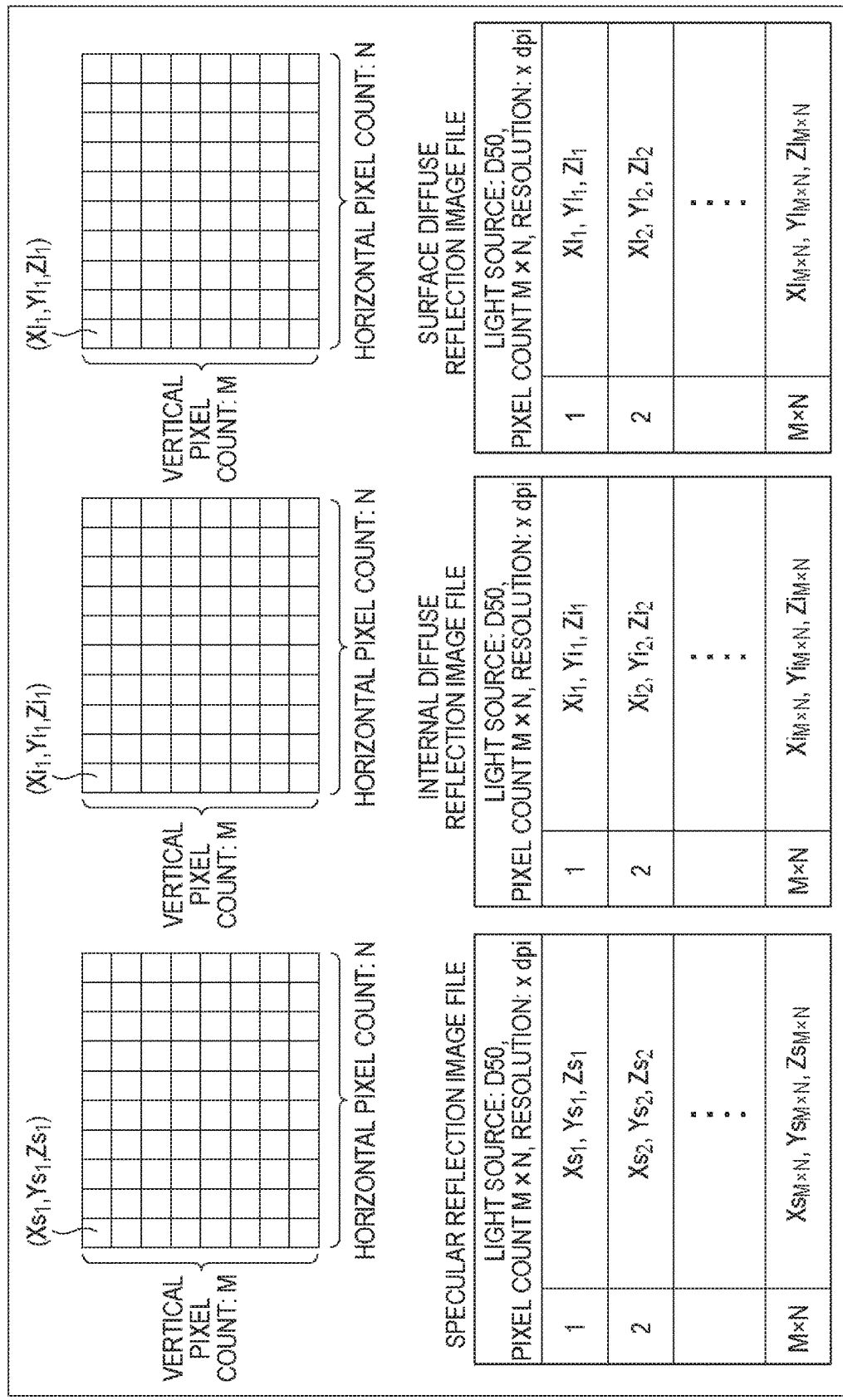

[Fig. 14]
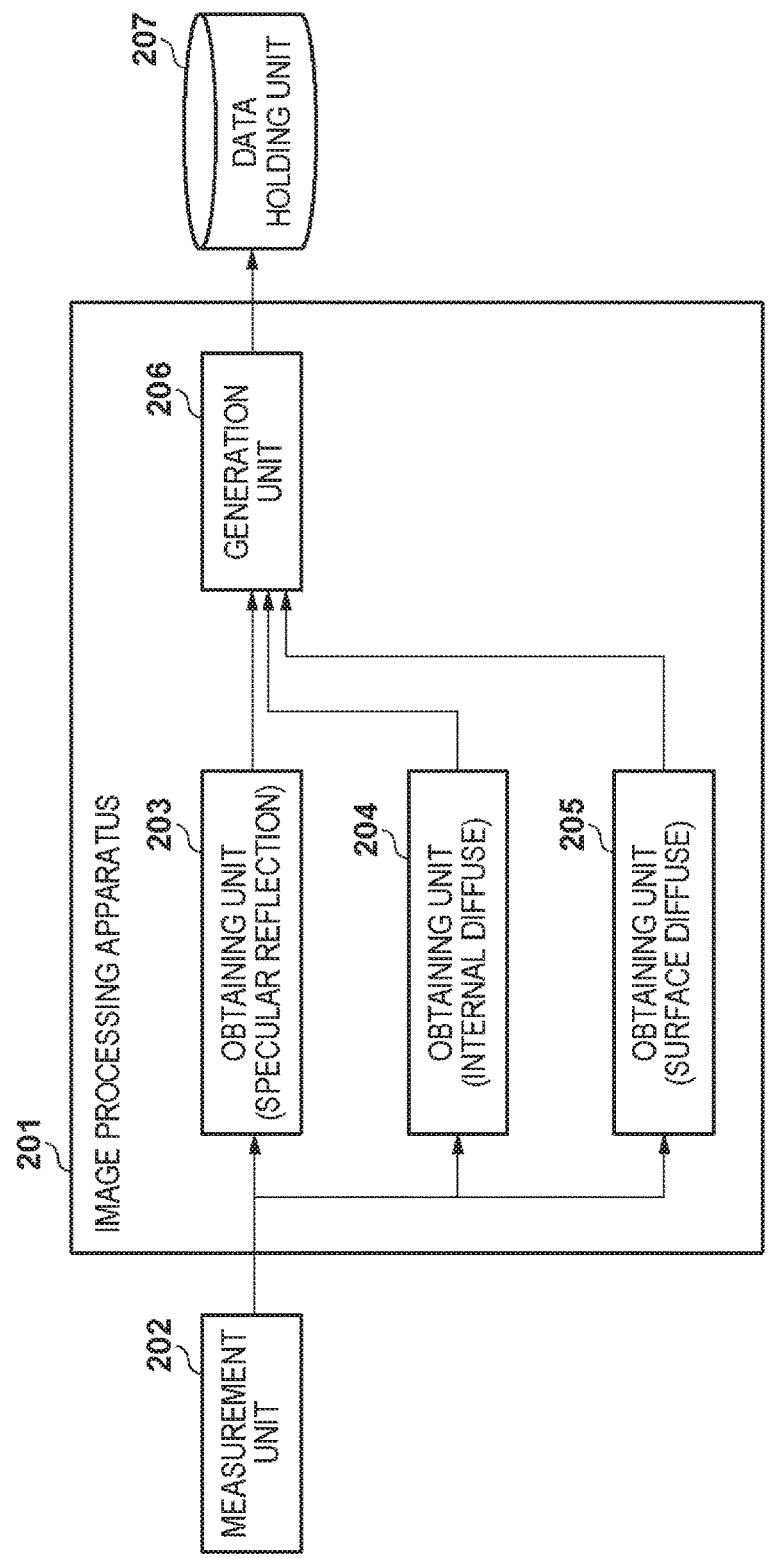

[Fig. 15]
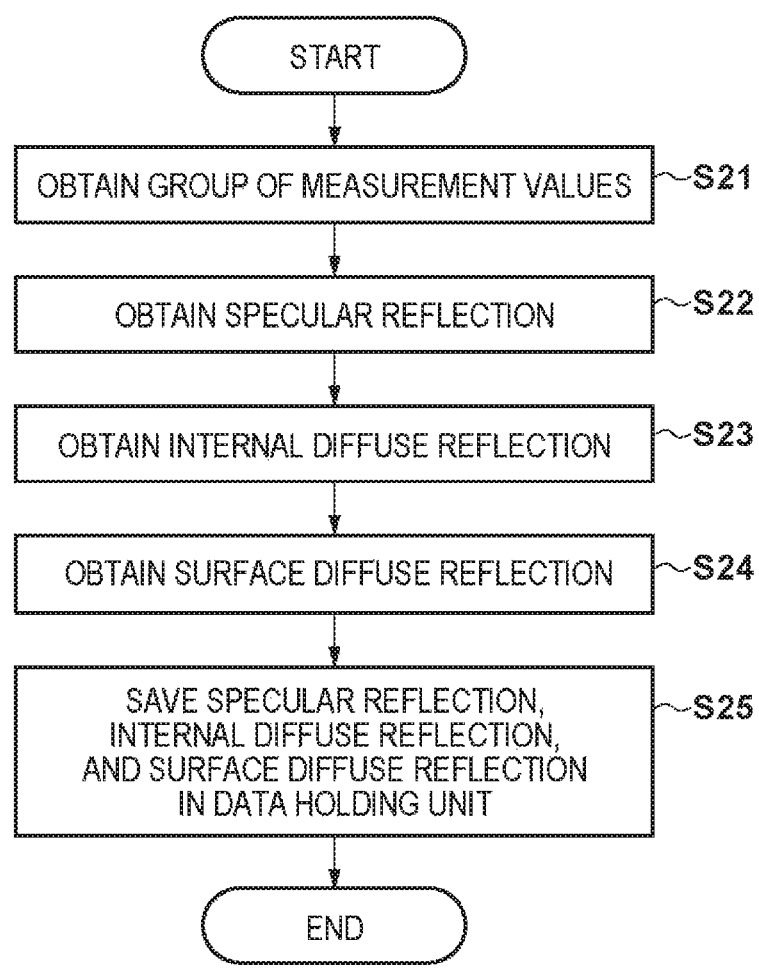

[Fig. 16A]

| MEASURE-MENT ID | INCIDENT ELEVATION ANGLE (θi) | LIGHT RECEIVING ELEVATION ANGLE (θr) | INCIDENT AZIMUTH (φi) | LIGHT RECEIVING AZIMUTH (φr) | XYZ (PARALLEL) | X'Y'Z' (ORTHOGONAL) | SPECULAR REFLECTION LIGHT | INTERNAL DIFFUSE REFLECTION LIGHT | SURFACE DIFFUSE REFLECTION LIGHT |
|---|---|---|---|---|---|---|---|---|---|
| A-1 | 45 | −90 | 0 | 0 | (X1,Y1,Z1) | (X1',Y1',Z1') | (Xs1,Ys1,Zs1) | (XI1,YI1,ZI1) | (XI1,YI1,ZI1) |
| A-2 | 45 | −75 | 0 | 0 | (X2,Y2,Z2) | (X2',Y2',Z2') | | | |
| A-3 | 45 | −60 | 0 | 0 | (X3,Y3,Z3) | (X3',Y3',Z3') | | | |
| A-4 | 45 | −45 | 0 | 0 | (X4,Y4,Z4) | (X4',Y4',Z4') | | | |
| A-5 | 45 | −30 | 0 | 0 | (X5,Y5,Z5) | (X5',Y5',Z5') | | | |
| A-6 | 45 | −15 | 0 | 0 | (X6,Y6,Z6) | (X6',Y6',Z6') | | | |
| A-7 | 45 | 0 | 0 | 0 | (X7,Y7,Z7) | (X7',Y7',Z7') | | | |
| A-8 | 45 | 15 | 0 | 0 | (X8,Y8,Z8) | (X8',Y8',Z8') | | | |
| A-9 | 45 | 30 | 0 | 0 | (X9,Y9,Z9) | (X9',Y9',Z9') | | | |
| A-10 | 45 | 45 | 0 | 0 | (X10,Y10,Z10) | (X10',Y10',Z10') | | | |
| A-11 | 45 | 60 | 0 | 0 | (X11,Y11,Z11) | (X11',Y11',Z11') | | | |
| A-12 | 45 | 75 | 0 | 0 | (X12,Y12,Z12) | (X12',Y12',Z12') | | | |
| A-13 | 45 | 90 | 0 | 0 | (X13,Y13,Z13) | (X13',Y13',Z13') | | | |

[Fig. 16B]

| | | | | | | | (Xs2,Ys2,Zs2) | (Xl2,Yl2,Zl2) | (Xl2,Yl2,Zl2) |
|---|---|---|---|---|---|---|---|---|---|
| B-1 | 45 | -90 | 0 | 0 | (X14,Y14,Z14) | (X14',Y14',Z14') | | | |
| B-2 | 45 | -75 | 0 | 0 | (X15,Y15,Z15) | (X15',Y15',Z15') | | | |
| B-3 | 45 | -60 | 0 | 0 | (X16,Y16,Z16) | (X16',Y16',Z16') | | | |
| B-4 | 45 | -45 | 0 | 0 | (X17,Y17,Z17) | (X17',Y17',Z17') | | | |
| B-5 | 45 | -30 | 0 | 0 | (X18,Y18,Z18) | (X18',Y18',Z18') | | | |
| B-6 | 45 | -15 | 0 | 0 | (X19,Y19,Z19) | (X19',Y19',Z19') | | | |
| B-7 | 45 | 0 | 0 | 0 | (X20,Y20,Z20) | (X20',Y20',Z20') | | | |
| B-8 | 45 | 15 | 0 | 0 | (X21,Y21,Z21) | (X21',Y21',Z21') | | | |
| B-9 | 45 | 30 | 0 | 0 | (X22,Y22,Z22) | (X22',Y22',Z22') | | | |
| B-10 | 45 | 45 | 0 | 0 | (X23,Y23,Z23) | (X23',Y23',Z23') | | | |
| B-11 | 45 | 60 | 0 | 0 | (X24,Y24,Z24) | (X24',Y24',Z24') | | | |
| B-12 | 45 | 75 | 0 | 0 | (X25,Y25,Z25) | (X25',Y25',Z25') | | | |
| B-13 | 45 | 90 | 0 | 0 | (X26,Y26,Z26) | (X26',Y26',Z26') | | | |
| C-1 | 45 | -90 | 0 | 0 | (X27,Y27,Z27) | (X27',Y27',Z27') | (Xs3,Ys3,Zs3) | (Xl3,Yl3,Zl3) | (Xl3,Yl3,Zl3) |
| ⋮ | | | | | ⋮ | | ⋮ | ⋮ | ⋮ |

[Fig. 17]
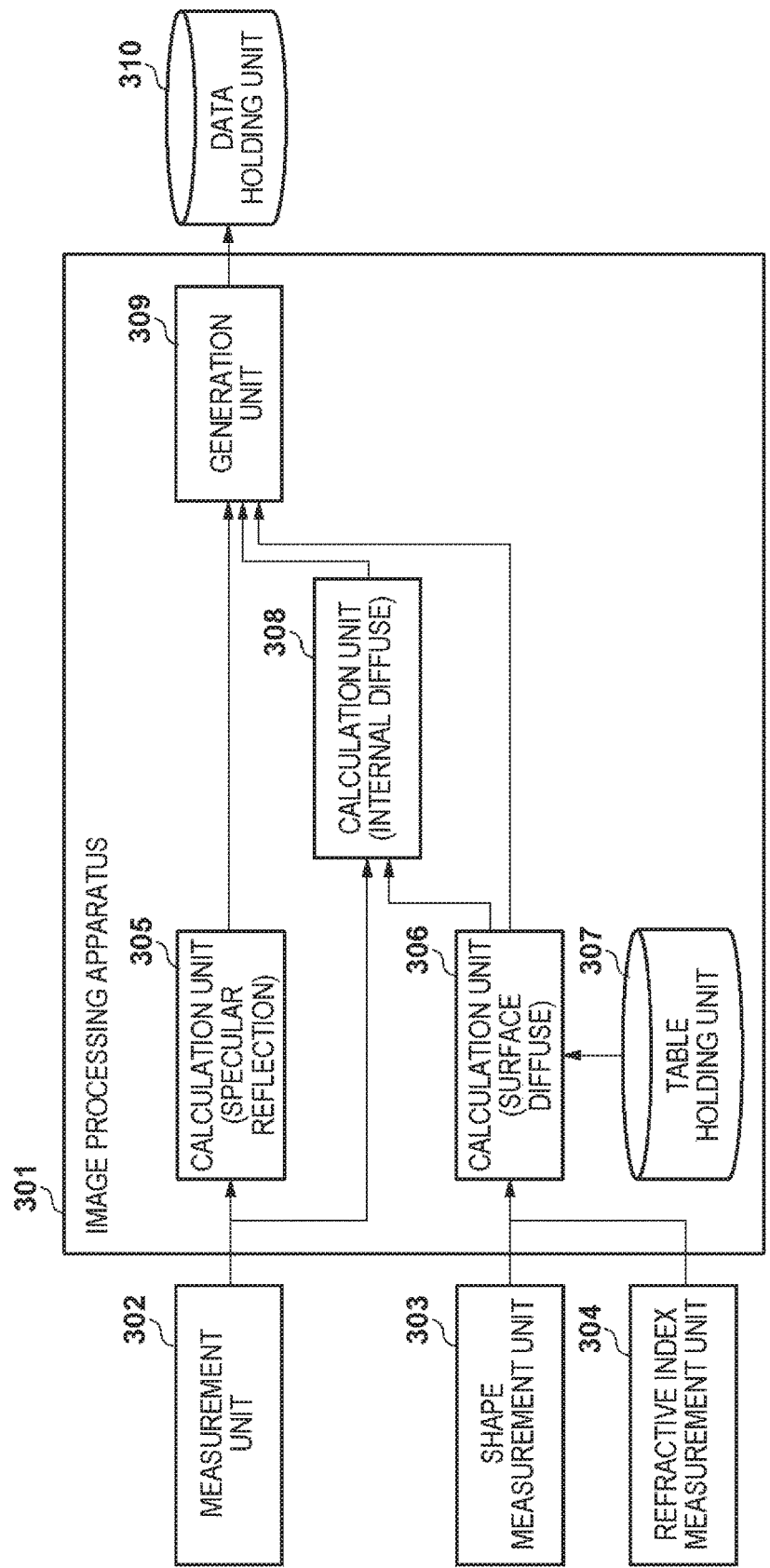

[Fig. 18]
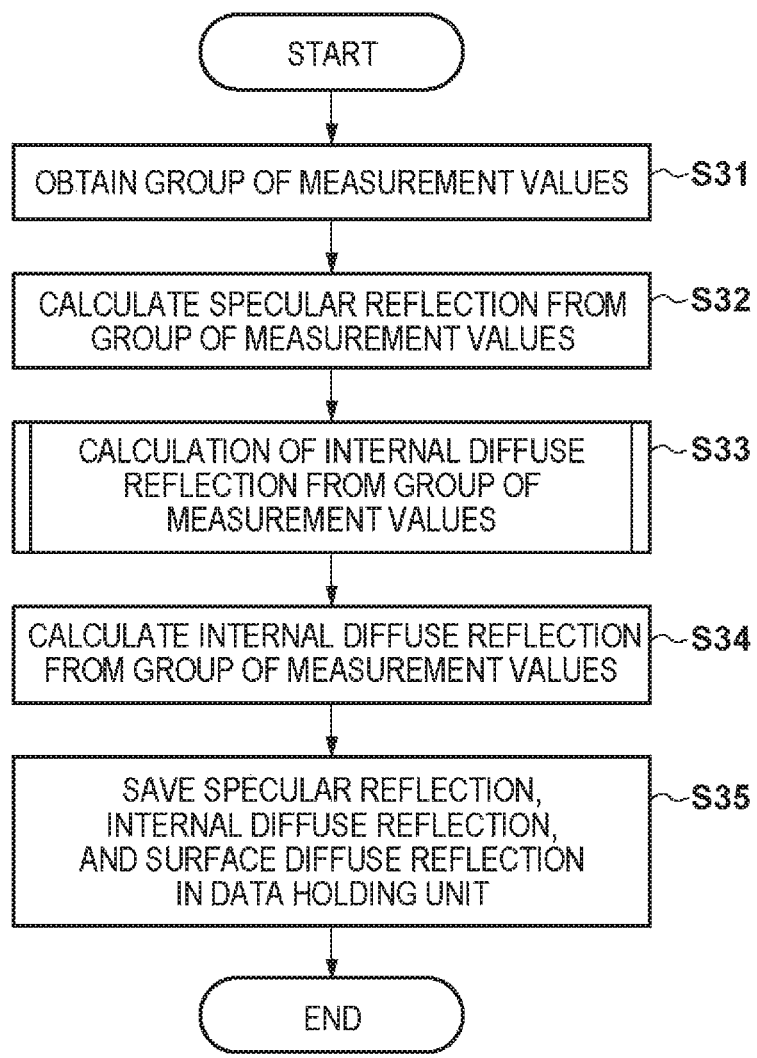

[Fig. 19]

| MEASURE-MENT ID | INCIDENT ELEVATION ANGLE ($\theta i$) | LIGHT RECEIVING ELEVATION ANGLE ($\theta r$) | INCIDENT AZIMUTH ($\phi i$) | LIGHT RECEIVING AZIMUTH ($\phi r$) | XYZ |
|---|---|---|---|---|---|
| A-1 | 45 | −60 | 0 | 0 | (X1,Y1,Z1) |
| A-2 | 45 | −55 | 0 | 0 | (X2,Y2,Z2) |
| A-3 | 45 | −50 | 0 | 0 | (X3,Y3,Z3) |
| A-4 | 45 | −45 | 0 | 0 | (X4,Y4,Z4) |
| A-5 | 45 | −40 | 0 | 0 | (X5,Y5,Z5) |
| A-6 | 45 | −35 | 0 | 0 | (X6,Y6,Z6) |
| A-7 | 45 | −30 | 0 | 0 | (X7,Y7,Z7) |
| A-8 | 45 | −25 | 0 | 0 | (X8,Y8,Z8) |
| A-9 | 45 | −20 | 0 | 0 | (X9,Y9,Z9) |
| A-10 | 45 | −15 | 0 | 0 | (X10,Y10,Z10) |
| A-11 | 45 | −10 | 0 | 0 | (X11,Y11,Z11) |
| A-12 | 45 | −5 | 0 | 0 | (X12,Y12,Z12) |
| A-13 | 45 | 0 | 0 | 0 | (X13,Y13,Z13) |
| A-14 | 45 | 5 | 0 | 0 | (X14,Y14,Z14) |
| A-15 | 45 | 10 | 0 | 0 | (X15,Y15,Z15) |
| A-16 | 45 | 15 | 0 | 0 | (X16,Y16,Z16) |
| A-17 | 45 | 20 | 0 | 0 | (X17,Y17,Z17) |
| A-18 | 45 | 25 | 0 | 0 | (X18,Y18,Z18) |
| A-19 | 45 | 30 | 0 | 0 | (X19,Y19,Z19) |
| A-20 | 45 | 35 | 0 | 0 | (X20,Y20,Z20) |
| A-21 | 45 | 40 | 0 | 0 | (X21,Y21,Z21) |
| A-22 | 45 | 45 | 0 | 0 | (X22,Y22,Z22) |
| A-23 | 45 | 50 | 0 | 0 | (X23,Y23,Z23) |
| A-24 | 45 | 55 | 0 | 0 | (X24,Y24,Z24) |
| A-25 | 45 | 60 | 0 | 0 | (X25,Y25,Z25) |
| A-26 | 45 | −60 | 0 | 30 | (X26,Y26,Z26) |
| A-27 | 45 | −55 | 0 | 30 | (X27,Y27,Z27) |
| ... | ... | ... | ... | ... | ... |

[Fig. 20]
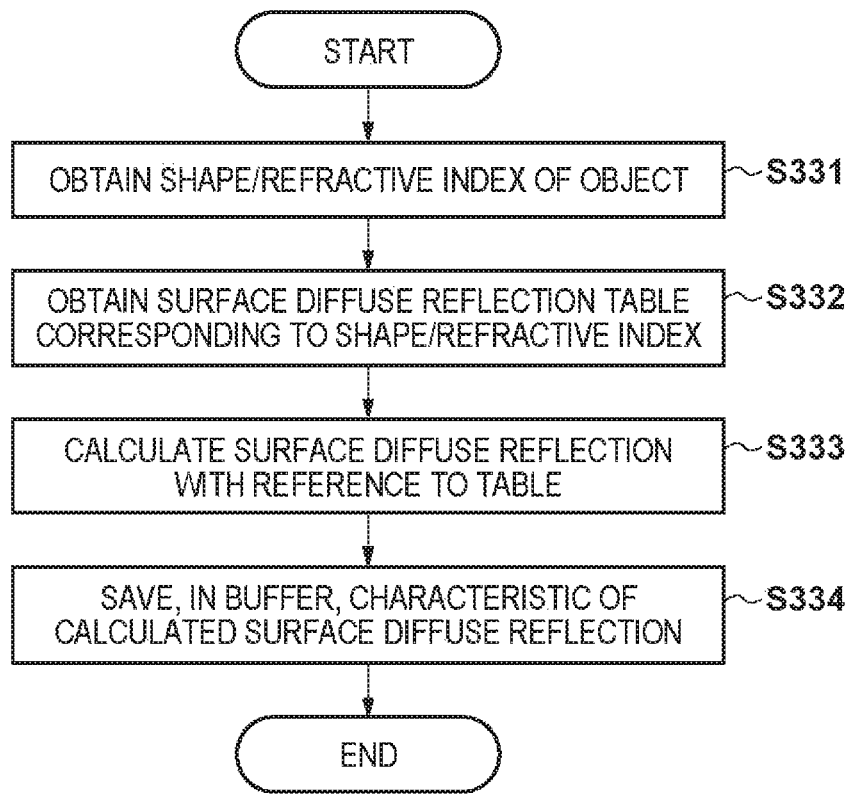

[Fig. 21]

| SHAPE / REFRACTIVE INDEX | N1 | N2 | N3 | N4 | ... | Nn |
|---|---|---|---|---|---|---|
| R1 | $k_{11}$ | $k_{12}$ | $k_{13}$ | $k_{14}$ | ... | $k_{1n}$ |
| R2 | $k_{21}$ | $k_{22}$ | $k_{23}$ | $k_{24}$ | ... | $k_{2n}$ |
| R3 | $k_{31}$ | $k_{32}$ | $k_{33}$ | $k_{34}$ | ... | $k_{3n}$ |
| R4 | $k_{41}$ | $k_{42}$ | $k_{43}$ | $k_{44}$ | ... | $k_{4n}$ |
| R5 | $k_{51}$ | $k_{52}$ | $k_{53}$ | $k_{54}$ | ... | $k_{5n}$ |
| ... | ... | ... | ... | ... | ... | ... |
| Rn | $k_{n1}$ | $k_{n2}$ | $k_{n3}$ | $k_{n4}$ | ... | $k_{nn}$ |

[Fig. 22]
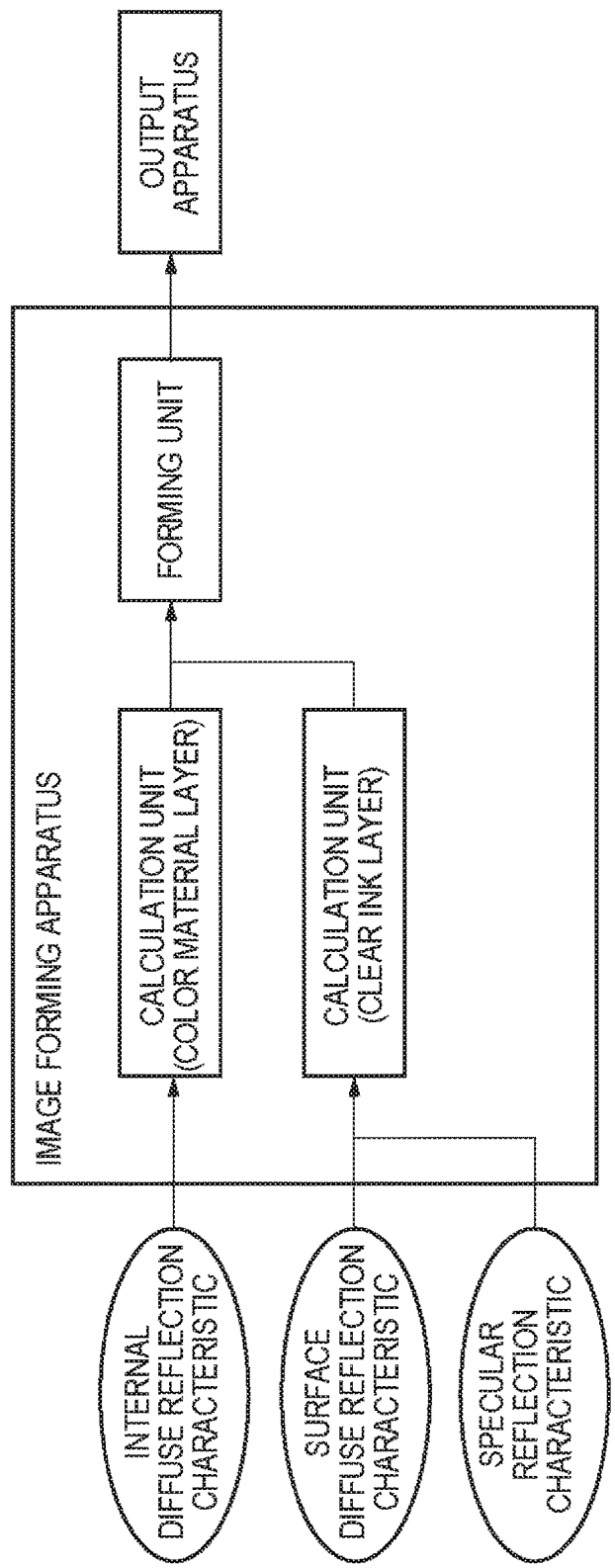

[Fig. 23]
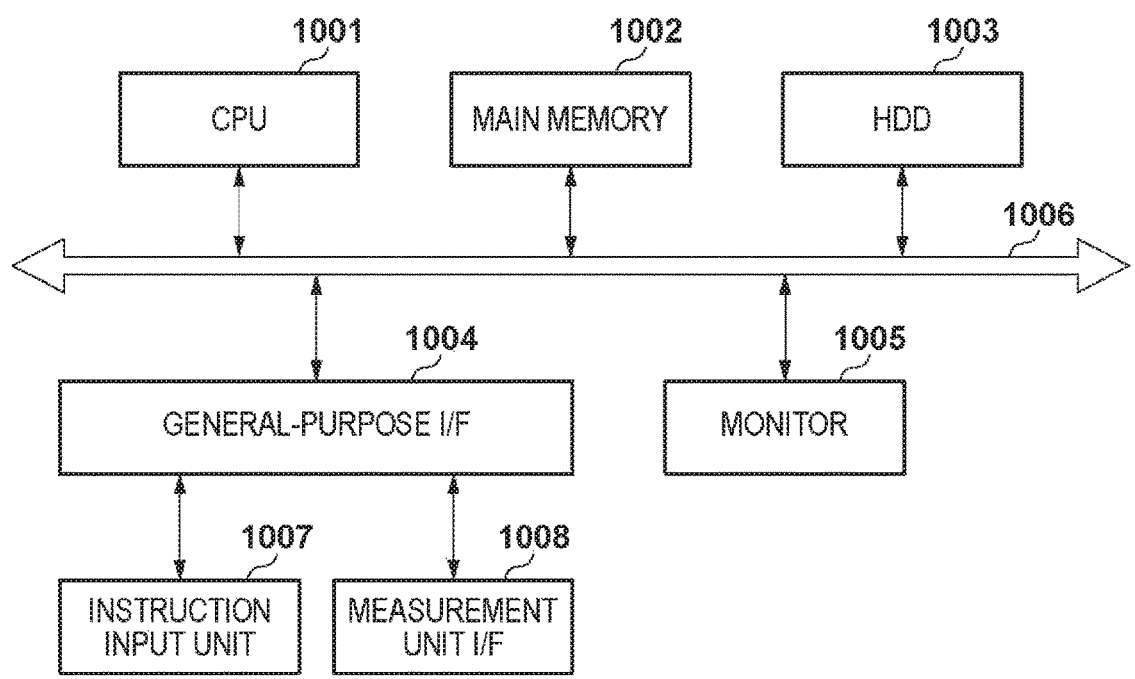

INFORMATION PROCESSING APPARATUS, METHOD OF DERIVING REFLECTION CHARACTERISTICS, PROGRAM, AND REFLECTION CHARACTERISTIC PROFILE

TECHNICAL FIELD

The present invention relates to a technique of obtaining the reflection characteristics of an object.

BACKGROUND ART

There is provided a bidirectional reflectance distribution function (BRDF) as a method of representing the reflection characteristics of an object. A BRDF is obtained by describing a reflection characteristic for each angle of the object. It is possible to reproduce the appearance of the object in accordance with a light source/viewpoint by reproducing a BRDF. If the BRDF is processed intact, the data amount is huge. Thus, a method of defining a model called a reflection model and approximating/representing the BRDF by the parameters of the model is often used.

As a reflection model, a model representing a specular reflection characteristic indicating the characteristic of reflected light in a specular reflection direction on an object surface with respect to incident light and a diffuse reflection characteristic indicating the characteristic of light reflected in a direction other than the specular reflection direction is common. Patent literature (PTL) 1 describes a technique of reproducing, on a monitor, an image of a printed material under observation illumination using colorimetric values of specular reflection light and diffuse reflection light for the printed material.

It is known that the diffuse reflection light includes internal diffuse reflection light and surface diffuse reflection light. The internal diffuse reflection light is light which exits again from the surface after scattering and absorption in the object. The surface diffuse reflection light is light which is diffused and reflected in all directions due to the fine unevenness of the object surface. PTL 2 describes a technique of detecting polarized components of internal diffuse reflection light included in diffuse reflection light from a printing sheet, and specifying the type of the printing sheet.

To reproduce the appearance of an object, it is only necessary to correctly obtain and reproduce the above-described specular reflection characteristic and diffuse reflection characteristic. However, as described above, diffuse reflection includes two reflected light components different in property, that is, internal diffuse reflection light and surface diffuse reflection light, and the diffuse reflection characteristic changes nonlinearly depending on an observation light source. Thus, for example, even if the diffuse reflection characteristic under a given measurement light source is reproduced, diffuse reflection light under another observation light source cannot be reproduced.

CITATION LIST

Patent Literature

PTL 1: Japanese Patent Laid-Open No. 2012-044421
PTL 2: Japanese Patent Laid-Open No. 2013-181797

SUMMARY OF INVENTION

According to one aspect of the present invention, an information processing apparatus comprises: obtaining means for obtaining a plurality of measurement values by receiving, from each of a plurality of directions, reflected light from an object illuminated by light from a given direction; and deriving means for deriving, based on the plurality of measurement values, a characteristic of specular reflection light as a reflected light component in a specular reflection direction corresponding to the given direction with respect to a surface of the object, a characteristic of internal diffuse reflection light as a reflected light component after scattering and absorption in the object, and a characteristic of surface diffuse reflection light as a reflected light component which has been diffused on the surface of the object.

The present invention provides a technique of obtaining the reflection characteristics of an object which can reproduce the appearance of the object more correctly.

Further features of the present invention will become apparent from the following description of exemplary embodiments (with reference to the attached drawings).

BRIEF DESCRIPTION OF DRAWINGS

The accompanying drawings, which are incorporated in and constitute a part of the specification, illustrate embodiments of the invention and, together with the description, serve to explain the principles of the invention.

FIG. 1A is a schematic view for explaining reflected light from an object with respect to incident light.

FIG. 1B is a schematic view for explaining reflected light from an object with respect to incident light.

FIG. 2 is a block diagram showing the arrangement of an image processing apparatus according to the first embodiment.

FIG. 3 is a flowchart illustrating processing executed by the image processing apparatus according to the first embodiment.

FIG. 4A is a view for explaining a method of measuring reflected light by a measurement unit.

FIG. 4B is a view for explaining a method of measuring reflected light by a measurement unit.

FIG. 4C is a view for explaining a method of measuring reflected light by a measurement unit.

FIG. 5 is a table exemplifying a measurement file.

FIG. 6 is a view for explaining generation of a plurality of measurement files based on a measurement image.

FIG. 7 is a graph for explaining the correspondence between three kinds of reflected light components and measurement values.

FIG. 8 is a flowchart illustrating processing executed by a calculation unit 103.

FIG. 9 is a flowchart illustrating processing executed by a calculation unit 104.

FIG. 10 is a flowchart illustrating processing executed by a calculation unit 105.

FIG. 11 is a flowchart illustrating details of processing in step S143.

FIG. 12 is a view exemplifying a reflection characteristic profile.

FIG. 13 is a view exemplifying a reflection characteristic profile in another form.

FIG. 14 is a block diagram showing the arrangement of an image processing apparatus according to the second embodiment.

FIG. 15 is a flowchart illustrating processing executed by the image processing apparatus according to the second embodiment.

FIG. 16A is a table exemplifying a measurement file.

FIG. 16B is a table exemplifying a measurement file.

FIG. 17 is a block diagram showing the arrangement of an image processing apparatus according to the third embodiment.

FIG. 18 is a flowchart illustrating processing executed by the image processing apparatus according to the third embodiment.

FIG. 19 is a table exemplifying a measurement file.

FIG. 20 is a flowchart illustrating processing executed by a calculation unit 306.

FIG. 21 is a table exemplifying the characteristic table of surface diffuse reflection light.

FIG. 22 is a block diagram for explaining formation of an image based on a reflection characteristic profile.

FIG. 23 is a block diagram showing the hardware arrangement of the image processing apparatus.

DESCRIPTION OF EMBODIMENTS

Preferred embodiments of the present invention will be described in detail below with reference to the accompanying drawings. Note that the following embodiments are merely examples, and are not intended to limit the scope of the present invention.

First Embodiment

As the first embodiment of an information processing apparatus according to the present invention, an image processing apparatus which processes data obtained by a measurement unit for measuring reflected light from an object will be exemplified below.

—Components of Reflected Light—

FIG. 1A is a schematic view for explaining reflected light from an object with respect to incident light. As shown in FIG. 1A, the reflected light includes specular reflection light as reflected light in the specular reflection direction and diffuse reflection light as reflected light in a direction other than the specular reflection direction. Furthermore, the diffuse reflection light includes internal diffuse reflection light which exits again from the surface after scattering and absorption in the object and surface diffuse reflection light which is diffused and reflected in all directions due to the fine unevenness of the object surface.

The internal diffuse reflection light has a characteristic to change depending on the color absorptance of the object, and the surface diffuse reflection light has a characteristic to change depending on the surface shape of the object and the refractive index of the material of the object. Therefore, if the geometric conditions or light amount of an observation light source changes, different change amounts are obtained.

For example, as exemplarily shown in FIG. 1B, the absolute amount and component ratio of reflected light are different between observation from viewpoint A (a direction of 0°) and observation from viewpoint B (a direction of 60°). Thus, it is impossible to reproduce a change in appearance of a color when the viewpoint position changes, by only matching the light amounts of diffuse reflection light. Therefore, to correctly reproduce the appearance of the object such as color and gloss, it is necessary to obtain and reproduce the specular reflection characteristic, internal diffuse reflection characteristic, and surface diffuse reflection characteristic as the reflection characteristics of the object.

In the first embodiment, a method of measuring the light amount of reflected light from an object from each of a plurality of angles and deriving the above-described three reflection characteristics will be described. Especially, a method of calculating the above-described three reflection characteristics based on the light amounts of reflected light from an object, which have been obtained under different polarization conditions will be described below.

—Apparatus Arrangement—

FIG. 2 is a block diagram showing the arrangement of an image processing apparatus 101 according to the first embodiment. A measurement unit 102 is a functional unit for measuring the amount of reflected light from an object. A calculation unit 103 is a functional unit for calculating the characteristic of specular reflection light from a group of measurement values measured by the measurement unit 102. A calculation unit 104 is a functional unit for calculating the characteristic of internal diffuse reflection light from the group of measurement values measured by the measurement unit 102. A calculation unit 105 is a functional unit for calculating the characteristic of surface diffuse reflection light from the group of measurement values measured by the measurement unit 102. Note that FIG. 2 shows the measurement unit 102 as an external measurement apparatus but the image processing apparatus 101 may include the measurement unit 102.

A generation unit 106 is a functional unit for generating data (profile) in a predetermined format based on the characteristics of the specular reflection light, internal diffuse reflection light, and surface diffuse reflection light calculated by the calculation units 103 to 105. A data holding unit 107 holds the generated data.

FIG. 23 is a block diagram showing the hardware arrangement of the image processing apparatus 101. The image processing apparatus 101 includes a CPU 1001, a main memory 1002, an HDD 1003, a general-purpose interface (I/F) 1004, a monitor 1005, a main bus 1006, an instruction input unit 1007, and a measurement unit interface (I/F) 1008.

The general-purpose I/F 1004 is, for example, a universal serial bus (USB). Alternatively, a communication interface such as Ethernet® may be used. The instruction input unit 1007 is a device such as a keyboard and mouse for accepting an operation from the user. The measurement unit I/F 1008 is an interface for connection to the measurement unit 102.

A form in which the respective functional units of the image processing apparatus 101 shown in FIG. 2 are implemented when the CPU 1001 executes software programs will be described below. However, some or all of the functional units of the image processing apparatus 101 may be processed by hardware such as an application specific integrated circuit (ASIC) or FPGA. Note that FPGA is an abbreviation for field programmable gate array.

In response to a user instruction to the instruction input unit 1007, the CPU 1001 activates an application stored in the HDD 1003. The CPU 1001 displays a user interface on the monitor 1005 while loading the application into the main memory 1002. Subsequently, various data stored in the HDD 1003 are transferred to the main memory 1002 based on a command from the CPU 1001. The various data transferred to the main memory 1002 undergo predetermined calculation processing in response to a command from the CPU 1001. The result of the calculation processing is displayed on, for example, the monitor 1005.

—Operation of Apparatus—

FIG. 3 is a flowchart illustrating processing executed by the image processing apparatus 101 according to the first embodiment.

In step S1, the image processing apparatus 101 issues a measurement instruction to the measurement unit 102, and obtains a measurement file including a group of measurement values obtained by measurement.

FIGS. 4A to 4C are views for explaining a method of measuring reflected light by the measurement unit. FIG. 5 is a table exemplifying the measurement file. In the measurement file, a measurement ID is an ID for identifying each measurement sample. The first character represents the name of a measurement target, and the last number represents a serial number when performing measurement by changing a measurement angle.

An incident elevation angle (θi), a light receiving elevation angle (θr), an incident azimuth (φi), and a light receiving azimuth (φr) represent the incident direction of light on a sample surface (object) and a light receiving direction in a light receiving unit, and are defined, as shown in FIG. 4A. Note that in this example, the incident elevation angle (given direction) as the illumination direction from the light source is fixed to 45°, and the incident azimuth of the light source is changed from 0° to 180° every 30°. Assume that the light receiving elevation angle of the light receiving unit is changed from −60° to 60° every 5°, and the light receiving azimuth of the light receiving unit is changed from 00 to 180° every 30°. Note that measurement values measured using different steps under different angle conditions may be described in a measurement file.

XYZ tristimulus values obtained when measuring reflected light under the above-described angle conditions are described as XYZ (parallel) and X'Y'Z' (orthogonal). Especially, measurement values obtained when polarization filters on the light source side (light before reflection) and the light receiving side (light after reflection) are parallel to each other, as shown in FIG. 4B, are described as XYZ (parallel). On the other hand, measurement values obtained when polarization filters on the light source side and the light receiving side are orthogonal to each other, as shown in FIG. 4C, are described as X'Y'Z' (orthogonal).

As for XYZ (parallel), measurement values at an angle in the specular reflection direction in which the light source is reflected represent the characteristic of the specular reflection light, and measurement values at an angle other than the specular reflection direction represent the characteristic of the diffuse reflection light. The measurement values as X'Y'Z' (orthogonal) represent the characteristic of the internal diffuse reflection light. Note that in addition to the reflected light, the half width of the reflected light or information of an angle at which the reflected light has an intensity equal to that of the diffuse reflection light may be obtained and held as the characteristic of the specular reflection light.

FIG. 7 is a graph for explaining the correspondence between three kinds of reflected light components and the measurement values. More specifically. FIG. 7 schematically shows the luminance when the object is measured while changing the angle, in which the abscissa represents the angle and the ordinate represents a reflection luminance. The measurement values of XYZ (parallel) described in the measurement file correspond to solid circles in FIG. 7, and the measurement values of X'Y'Z' (orthogonal) correspond to open circles in FIG. 7.

The characteristic of the specular reflection light is calculated by subtracting XYZ (parallel) at an angle other than the specular reflection direction from XYZ (parallel) of the reflected light at an angle in the specular reflection direction. In addition, surface diffuse reflection is calculated by subtracting X'Y'Z' (orthogonal) from XYZ (parallel) at an angle other than the specular reflection direction.

Note that a two-dimensional sensor such as a camera may be used as a sensor for receiving the reflected light from the object. In this case, for example, the measurement ID indicates the x- and y-coordinates of an obtained image and RGB values indicating the shooting signal values of the camera are described as measurement values.

FIG. 6 is a view for explaining generation of a plurality of measurement files based on a measurement image obtained using a two-dimensional sensor. As shown in FIG. 6, the measurement file described with reference to FIG. 5 is held for each position of the image data. Note that the correspondence between shooting values and XYZ tristimulus values is preferably calibrated before measurement so that the camera shooting values ensure luminance linearity with the XYZ tristimulus values. However, after measurement, conversion may be performed to ensure luminance linearity between the shooting values and the XYZ tristimulus values. The two-dimensional sensor is not limited to an RGB camera. An XYZ camera for measuring XYZ tristimulus values may be used, or a multiband camera for measuring the spectral reflection luminance of the object may be used.

In step S12, the calculation unit 103 calculates specular reflection light based on the measurement values obtained in step S11. Note that details of the processing of the calculation unit 103 will be described later. In step S13, the calculation unit 104 calculates internal diffuse reflection light based on the measurement values obtained in step S11. Note that details of the processing of the calculation unit 104 will be described later. In step S14, the calculation unit 105 calculates surface diffuse reflection light based on the measurement values obtained in step S11. Note that details of the processing of the calculation unit 105 will be described later.

In step S15, the generation unit 106 generates a reflection characteristic profile based on the specular reflection light calculated in step S12, the internal diffuse reflection light calculated in step S13, and the surface diffuse reflection light calculated in step S14. The generated profile is held in the data holding unit 107.

FIG. 12 is a view exemplifying the reflection characteristic profile. Referring to FIG. 12, light source information when measuring the object, and the XYZ tristimulus values of each of the specular reflection light, internal diffuse reflection light, and surface diffuse reflection light are described. Note that as for the surface diffuse reflection light, if the light is reflected isotropically, one representative value is described; otherwise, surface diffuse reflection light at each angle is described.

Note that the format of the profile is not limited to that shown in FIG. 12. For example, if a camera is used as a sensor, the XYZ tristimulus values of the specular reflection light, internal diffuse reflection light, and surface diffuse reflection light are held at each x-y coordinate point of the image, as shown in FIG. 13. Referring to FIG. 13, an individual image is held for each of the three reflected light components. However, one image may include a plurality of layers to hold the characteristics of the respective reflected light components. Furthermore, the characteristic of each of the reflected light components held as data is not limited to the representation of the XYZ tristimulus values, and may be a luminance reflectance, shooting signal values, a spectral reflection luminance, or a spectral reflectance.

—Operation (S12) of Calculation Unit 103—

FIG. 8 is a flowchart illustrating the processing executed by the calculation unit 103. More specifically. FIG. 8 is a flowchart illustrating the processing of calculating the characteristic of specular reflection light, which is executed in step S12.

In step S121, the calculation unit 103 obtains the measurement values of the same measurement ID with reference to the measurement file in which the group of measurement values obtained in step S1 is described. The same measurement ID indicates the measurement IDs having the same first character. If the measurement file is the image file shown in FIG. 6, the measurement values at the same coordinate point are obtained.

In step S122, the calculation unit 103 calculates, from the measurement values obtained in step S121, the differences between the maximum values (max) and minimum values (min) of XYZ (parallel) indicating the tristimulus values measured under the condition that the polarization state (polarization direction) is a parallel state, as given by:

[Math.1]

$$Xs = X_{max} - X_{min}$$

$$Ys = Y_{max} - Y_{min}$$

$$Zs = Z_{max} - Z_{min} \quad (1)$$

where Xs represents the X value of the specular reflection light, Ys represents the Y value of the specular reflection light, and Zs represents the Z value of the specular reflection light.

Note that the specular reflection is calculated from the difference values between the maximum values and minimum values of XYZ (parallel). However, a method of calculating the difference values with reference to the values of XYZ (parallel) at a predetermined angle may be used. For example, if the incident angle of the light source is 45°, specular reflection may be calculated by subtracting, from the XYZ values at a light receiving angle of 45° as an angle in the specular reflection direction, the XYZ values at 180° which is farthest from 45°.

In step S123, the calculation unit 103 calculates a specular reflectance Ysr by dividing Ys calculated in step S122 by a luminance Yp of the incident light of the light source. In step S124, the calculation unit 103 saves, in a buffer, the specular reflection light (XYZ values) calculated in step S122 and the reflectance (Ysr) calculated in step S123.

In step S125, the calculation unit 103 determines whether the characteristic of the specular reflection light has been calculated for all the measurement IDs. If the calculation is complete, the calculation unit 103 ends the process; otherwise, the calculation unit 103 returns to step S121 to advance the process.

—Operation (S13) of Calculation Unit 104—

FIG. 9 is a flowchart illustrating the processing executed by the calculation unit 104. More specifically, FIG. 9 is a flowchart illustrating the processing of calculating the characteristic of the internal diffuse reflection light, which is executed in step S13.

In step S131, the calculation unit 104 obtains the measurement values of the same measurement ID with reference to the file in which the group of measurement values obtained in step S11 are described. The same measurement ID indicates the measurement IDs having the same first character. If the measurement file is the image file shown in FIG. 6, the measurement values at the same coordinate point are obtained.

In step S132, the calculation unit 104 obtains, from the measurement values obtained in step S131, the values of X'Y'Z' (orthogonal) of the same ID for all the angles, and calculates the average value of the obtained measurement values. The internal diffuse reflection light is calculated by:

[Math. 2]

$$Xi = \frac{1}{n}\sum_{j=1}^{n} X'_j \quad (2)$$

$$Yi = \frac{1}{n}\sum_{j=1}^{n} Y'_j$$

$$Zi = \frac{1}{n}\sum_{j=1}^{n} Z'_j$$

where n represents the number of angle samples, Xi represents the X value of the internal diffuse reflection light, Yi represents the Y value of the internal diffuse reflection light, and Zi represents the Z value of the internal diffuse reflection light.

Note that in this example, the average value of the obtained measurement values, at all the angles, of the same ID is obtained as the internal diffuse reflection light. Another statistic such as a mode or median may be used. Alternatively, the measurement values of X'Y'Z' (orthogonal) for the reflected light in a predetermined angle direction may be used as the internal diffuse reflection light.

In step S133, the calculation unit 104 calculates an internal diffuse reflectance Yir by dividing Yi calculated in step S132 by the luminance Yp of the incident light of the light source. In step S134, the calculation unit 104 saves, in a buffer, the internal diffuse reflection light (XYZ values) calculated in step S132 and the reflectance (Yir) calculated in step S133.

In step S135, the calculation unit 104 determines whether the characteristic of the internal diffuse reflection light has been calculated for all the measurement IDs. If the calculation is complete, the calculation unit 104 ends the process; otherwise, the calculation unit 104 returns to step S131 to advance the process.

—Operation (S14) of Calculation Unit 105—

As described above, in step S14, the processing of calculating, as the surface diffuse reflection light, the difference value between the internal diffuse reflection light beams from the diffuse reflection light. Note that depending on the angle, specular reflection light is included in XYZ (parallel) described in the measurement file. Thus, the processing of calculating the surface diffuse reflection light is performed after excluding the angle including the specular reflection light.

Furthermore, determination for discriminating whether the surface diffuse reflection light is reflected isotropically or anisotropically is performed. If the light is reflected isotropically, one characteristic of the surface diffuse reflection light is saved. On the other hand, if the light is reflected anisotropically, the characteristic of the surface diffuse reflection light is saved for each of two or more angle directions.

In this example, the difference value between the luminance values of surface diffuse reflection light beams at adjacent angles is calculated. If the difference value is equal to or larger than a threshold, it is determined that the light is reflected anisotropically. If the difference value is smaller than the threshold, it is determined that the light is reflected isotropically. However, a method of determining isotropy or anisotropy is not limited to this. For example, the standard deviation or kurtosis of the luminance values of the surface diffuse reflection light beams may be calculated and then isotropy or anisotropy may be determined based on the shape of a frequency distribution. Alternatively, without determining isotropy or anisotropy, the difference value between the internal diffuse reflection light and the diffuse reflection light in a predetermined angle direction may be calculated and held as surface diffuse reflection light a plurality of times, regardless of whether the surface diffuse reflection light is reflected isotropically or anisotropically.

FIG. 10 is a flowchart illustrating the processing executed by the calculation unit 105. More specifically, FIG. 10 is a flowchart illustrating the processing of calculating the characteristic of the surface diffuse reflection light, which is executed in step S14.

In step S141, the calculation unit 105 obtains the measurement values of the same measurement ID from the file in which the measurement values obtained in step S11 are described. The same measurement ID indicates the measurement IDs having the same first character. If the measurement file is the image file shown in FIG. 6, the measurement values at the same coordinate point are obtained.

In step S142, with reference to XYZ (parallel) and X'Y'Z' (orthogonal) described in the measurement file obtained in step S141, the calculation unit 105 calculates the surface diffuse reflection light beams, the number of which is equal to that of light receiving elevation angles θr, under the respective angle conditions, as given by:

[Math. 3]

$$Xl_k = X_k - X'_k$$

$$Yl_k = Y_k - Y'_k$$

$$Zl_k = Z_k - Z'_k \quad (3)$$

where k represents an index value indicating the angle condition, Xl represent the X value of the surface diffuse reflection light. Yl represents the Y value of the surface diffuse reflection light, and Zl represents the Z value of the surface diffuse reflection light.

In step S143, the calculation unit 105 excludes reflected light at an angle including specular reflection light. Details of the processing in step S143 will be described later. In step S144, the calculation unit 105 obtains the surface diffuse reflection light beams from which the specular reflection light has been excluded in step S143, and calculates the difference value between the luminance values of the surface diffuse reflection light beams at the adjacent angles.

In step S145, for each of all the difference values, the calculation unit 105 determines whether the difference value calculated in step S144 is equal to or larger than the threshold. If there is the difference value equal to or larger than the threshold, the process advances to step S147. If all the difference values are smaller than the threshold, the process advances to step S146. A value of 10% of the luminance value of the surface diffuse reflection light beam as a calculation target is assumed to be set as the threshold. Another ratio may be used.

In step S146, the calculation unit 105 saves, in a buffer, one characteristic of the surface diffuse reflection light. In this example, the calculation unit 105 calculates the average value of the surface diffuse reflection light beams for which it is determined in step S145 that the difference value is smaller than the threshold, and saves it in the buffer. Note that another statistic value such as a mode or median may be used, or the surface diffuse reflection light at a predetermined angle may be saved in the buffer.

In step S147, the calculation unit 105 saves the characteristic of the surface diffuse reflection light for each angle. This example assumes that the surface diffuse reflection light beams at all the angles are saved. However, only the surface diffuse reflection light at an angle corresponding to the difference value which has been determined in step S145 to be equal to or larger than the threshold may be extracted and saved.

In step S148, the calculation unit 105 determines whether the surface diffuse reflection light has been calculated for all the measurement IDs. If the calculation is complete, the calculation unit 105 ends the process; otherwise, the calculation unit 105 returns to step S141 to advance the process.

—Detailed Operation in Step S143—

The method of excluding, from the reflected light beams, reflected light at an angle including specular reflection light in step S143 will now be described. Note that to discriminate between the specular reflection light and the diffuse reflection light, a threshold is set based on the difference values between XYZ (parallel) and X'Y'Z' (orthogonal), and it is determined whether the specular reflection light is included. However, a method of discriminating between the specular reflection light and the diffuse reflection light is not limited to this. For example, the standard deviation or kurtosis of the luminance values of the surface diffuse reflection light beams or diffuse reflection light beams may be calculated, and whether the specular reflection light is included may be determined based on the shape of a frequency distribution.

FIG. 11 is a flowchart illustrating details of the processing in step S143. In step S1431, the calculation unit 105 obtains the surface diffuse reflection light calculated in step S142. In step S1432, the calculation unit 105 determines whether the luminance of the surface diffuse reflection light obtained in step S1431 is smaller than a threshold. If the luminance is smaller than the threshold, the process advances to step S1433; otherwise, the process advances to step S1434. In this example, with reference to the luminance values of the surface diffuse reflection light beams calculated in step S142, a luminance value which is twice a smallest one of the luminance values is set as the threshold for discriminating between the specular reflection light and the diffuse reflection light. However, a value based on another criterion may be used as the threshold.

In step S1433, the calculation unit 105 saves, in the buffer, as the surface diffuse reflection light without the specular reflection light, the reflected light for which it is determined in step S1432 that the luminance is smaller than the threshold. In step S1434, the calculation unit 105 determines whether the threshold determination processing for determining whether the specular reflection light is included has been performed for all the angles. If the determination processing is complete, the calculation unit 105 ends the process; otherwise, the calculation unit 105 returns to step S1431 to advance the process.

With the above processing, the image processing apparatus 101 can generate a profile including pieces of reflection characteristic information of three reflected light components (specular reflection light, internal diffuse reflection light, and surface diffuse reflection light) from the object.

—Image Formation Using Profile—

To explain the effect of the profile holding the three reflection characteristics, an example of creating a printed material which reproduces the color and gloss of the object will be described.

In general, a color material layer (the amounts of CMYK inks and their discharge methods) is determined based on the diffuse reflection characteristic of the object, and a gloss layer (the amount of clear ink discharged to a color material surface and the discharge method of the clear ink) is determined based on the specular reflection characteristic of the object. However, the gloss layer influences not only the specular reflection characteristic but also the surface diffuse reflection characteristic of the printed material. Therefore, the diffuse reflection characteristic of the printed material also changes, and it is thus impossible to reproduce the correct color and gloss of the object as a reproduction target. To cope with this, an example of forming an image based on the above-described profile holding the three reflection characteristics, and creating a printed material which reproduces the color and gloss of the object more correctly.

FIG. 22 is a block diagram for explaining formation of an image based on the reflection characteristic profile. More specifically, to implement the three characteristics described in the profile, the parameters of the color material layer are calculated based on the internal diffuse reflection characteristic, and the parameters of the clear ink layer are calculated based on the surface diffuse reflection characteristic and specular reflection characteristic. Print data is formed based on the calculated parameters of the color material layer and clear ink layer, and output from an output apparatus, thereby making it possible to obtain a printed material which reproduces the color and gloss of the object more correctly.

As described above, according to the first embodiment, three reflection characteristics (specular reflection light, internal diffuse reflection light, and surface diffuse reflection light) are calculated based on a group of measurement values obtained by measuring the reflected light from an object under a plurality of different conditions. By using a profile storing the three reflection characteristics for image formation, it is possible to reproduce the reflection characteristics of the object more correctly.

Second Embodiment

The second embodiment will describe a form in which a measurement device for measuring reflected light calculates three reflection characteristics.

—Apparatus Arrangement—

FIG. 14 is a block diagram showing the arrangement of an image processing apparatus 201 according to the second embodiment. A measurement unit 202 is a functional unit for measuring reflected light from an object. As described above, the measurement unit 202 has a function of calculating three reflection characteristics.

An obtaining unit 203 is a functional unit for obtaining the characteristic of specular reflection light from the object. An obtaining unit 204 is a functional unit for obtaining the characteristic of internal diffuse reflection light from the object. An obtaining unit 205 is a functional unit for obtaining the characteristic of surface diffuse reflection light from the object.

A generation unit 206 is a functional unit for generating data (profile) in a predetermined format based on the characteristics of the specular reflection light, internal diffuse reflection light, and surface diffuse reflection light respectively obtained by the obtaining units 203 to 205. A data holding unit 207 holds the generated data.

—Operation of Apparatus—

FIG. 15 is a flowchart illustrating processing executed by the image processing apparatus 201 according to the second embodiment.

In step S21, the image processing apparatus 201 issues a measurement instruction to the measurement unit 202, and obtains a measurement file obtained by measurement. Note that the measurement unit 202 calculates three reflection characteristics by the same calculation methods as those of the calculation units 103 to 105 in the first embodiment.

FIGS. 16A and 16B are a table exemplifying the measurement file. The measurement file includes three reflection characteristics in addition to the items of the measurement file (FIG. 5) in the first embodiment. That is, the characteristics of the specular reflection light, internal diffuse reflection light, and surface diffuse reflection light calculated from a group of measurement values are added. Note that XYZ tristimulus values are described as characteristics. However, reflectances may be described or RGB values indicating shooting signal values may be described. If RGB values are described, a conversion profile for converting shooting signal values into a luminance signal value may be included.

In step S22, the obtaining unit 203 obtains the characteristic of the specular reflection light from the measurement file obtained in step S21. In step S23, the obtaining unit 204 obtains the characteristic of the internal diffuse reflection light from the measurement file obtained in step S21. In step S24, the obtaining unit 205 obtains the characteristic of the surface diffuse reflection light from the measurement file obtained in step S21.

In step S25, the generation unit 206 generates a reflection characteristic profile based on the specular reflection light obtained in step S22, the internal diffuse reflection light obtained in step S23, and the surface diffuse reflection light obtained in step S24. The generated profile is held in the data holding unit 207.

As described above, according to the second embodiment, three reflection characteristics (specular reflection light, internal diffuse reflection light, and surface diffuse reflection light) calculated by the measurement unit are obtained from the measurement unit, and a profile storing the three reflection characteristics is generated. By using the profile for image formation, it is possible to reproduce the reflection characteristics of the object more correctly.

Third Embodiment

The third embodiment will describe a form in which a surface diffuse reflection characteristic is calculated from the shape of an object and the refractive index of the material of an object surface, instead of polarimetry of reflected light.

—Apparatus Arrangement—

FIG. 17 is a block diagram showing the arrangement of an image processing apparatus 301 according to the third embodiment. A measurement unit 302 is a functional unit for measuring the amount of reflected light from an object. A shape measurement unit 303 is a functional unit for measuring the unevenness (shape) of an object surface. A refractive index measurement unit 304 is a functional unit for measuring the refractive index of the material of the object surface.

A calculation unit 305 is a functional unit for calculating the characteristic of specular reflection light. A calculation unit 306 is a functional unit for deriving the surface diffuse characteristic of the object. A table holding unit 307 holds a reflection characteristic table based on the shape and refractive index. A calculation unit 308 is a functional unit for calculating the characteristic of internal diffuse reflection light from the object.

A generation unit 309 is a functional unit for generating data (profile) in a predetermined format based on the characteristics of the specular reflection light, internal diffuse reflection light, and surface diffuse reflection light respectively obtained by the calculation units 305, 306, and 308. A data holding unit 310 holds the generated data.

—Operation of Apparatus—

FIG. 18 is a flowchart illustrating processing executed by the image processing apparatus 301 according to the third embodiment.

In step S31, the image processing apparatus 301 obtains a measurement file as a measurement result of the measurement unit 302. FIG. 19 is a table exemplifying the measurement file. The measurement file includes XYZ values obtained by measuring reflected light without using any polarization filters. On the other hand, the X'Y'Z' values described in the first embodiment are not included.

In step S32, the calculation unit 305 calculates the characteristic of the specular reflection light from the measurement file obtained in step S31. Note that the processing of the calculation unit 305 is the same as the operation (step S12) of the calculation unit 103 according to the first embodiment and a description thereof will be omitted.

In step S33, the calculation unit 306 derives the surface diffuse characteristic of the object. In this example, calculation is performed with reference to a table which stores surface diffuse characteristics respectively associated with combinations of the shapes and refractive indices of objects, and is held in the table holding unit 307. Details of the processing of the calculation unit 306 will be described later.

In step S34, the calculation unit 308 calculates the characteristic of the internal diffuse reflection light from the object. More specifically, an internal diffuse reflectance is calculated as the characteristic of the internal diffuse reflection light by equation (4) below. A diffuse reflectance is calculated by obtaining, from the measurement file, a luminance value Y at an angle (an angle other than the specular reflection direction) at which no light source is reflected, and dividing the luminance value Y by a luminance Yp of the incident light of the light source.

[Math. 4]

$$r = l - k \quad (4)$$

where r represents the internal diffuse reflectance, l represents the diffuse reflectance, and k represents a surface diffuse reflectance.

In step S35, the generation unit 309 generates a reflection characteristic profile based on the specular reflection light calculated in step S32, the surface diffuse reflection light calculated in step S33, and the internal diffuse reflection light calculated in step S34. The generated profile is held in the data holding unit 310.

As the characteristic of the reflected light, a reflectance may be described or a luminance value obtained by multiplying the reflectance by the tristimulus values of the incident light of the light source may be described. Alternatively, the tristimulus values of the reflected light may be converted into shooting signal values and described as RGB values.

—Operation (S33) of Calculation Unit 306—

FIG. 20 is a flowchart illustrating processing executed by the calculation unit 306.

In step S331, the calculation unit 306 obtains the shape of the object and the refractive index of the material of the object (object information obtaining means). In this example, the shape measurement unit 303 obtains the shape of the object. The shape measurement unit 303 obtains the shape of the unevenness of the surface of the object by a known shape measurement method such as a light-section method or stereo shooting method. The refractive index measurement unit 304 obtains the refractive index of the material of the object. The refractive index measurement unit 304 obtains the refractive index of the material of the object by a known refractive index measurement method such as a critical angle method or V-block method.

In step S332, the calculation unit 306 obtains, from the table holding unit 307, the table storing surface diffuse characteristics respectively associated with combinations of the shapes and refractive indices of objects.

FIG. 21 is a table exemplifying the characteristic table of the surface diffuse reflection light. The characteristic table stores surface diffuse characteristics for combinations of the shapes and refractive indices of objects. The characteristic table is created in advance by measuring the shape and refractive index of the unevenness of the surface of an object and the characteristic of the surface diffuse reflection light of the object and associating them with each other.

In this example, as the shape of the unevenness of the surface of the object, an arithmetic average roughness N of data in the height direction is used. However, another statistic value such as the standard deviation or kurtosis may be used. Furthermore, in this example, a reflectance is used as a corresponding surface diffuse characteristic. However, the luminance value of the reflected light may be used. If the refractive index of the object is known, a table in which a shape and a surface diffuse reflectance are associated with each other may be used as a characteristic table.

In step S333, with reference to the characteristic table obtained in step S332, the calculation unit 306 selects the surface diffuse characteristic of the object based on the shape of the object and the measurement value of the refractive index, which have been obtained in step S331. In step S334, the calculation unit 306 saves, in a buffer, the surface diffuse characteristic calculated in step S333, and ends the process.

As described above, according to the third embodiment, a surface diffuse reflection characteristic is calculated based on the shape of an object and the refractive index of the material of an object surface. With this arrangement, it is possible to derive a surface diffuse reflection characteristic without performing measurement using polarization filters.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-099821, filed May 18, 2016 which is hereby incorporated by reference herein in its entirety.

The invention claimed is:

1. A non-transitory computer-readable recording medium storing a reflection characteristic profile associated with an object, the reflection characteristic profile comprising:
   characteristic information of specular reflection light as a reflected light component in a specular reflection direction with respect to a surface of the object;
   characteristic information of internal diffuse reflection light as a reflected light component after scattering and absorption inside the object; and
   characteristic information of surface diffuse reflection light as a reflected light component in which incident light does not enter an inside of the object and is diffused by unevenness on the surface of the object,
   wherein the characteristic information of the surface diffuse reflection light includes pieces of characteristic information associated with at least two different directions,
   wherein the characteristic information of internal diffuse reflection light is to be used to derive parameters for forming a color material layer on a printing medium, and
   wherein the characteristic information of specular reflection light and the characteristic information of surface diffuse reflection light are to be used to derive parameters for forming a clear material layer on the color material layer.

2. The non-transitory computer-readable recording medium according to claim 1, wherein the reflection characteristic profile further comprises light source information indicating a type of light source used to measure reflection characteristics of the object.

3. The non-transitory computer-readable recording medium according to claim 1, wherein each of (a) the characteristic information of specular reflection light, (b) the characteristic information of internal diffuse reflection light, and (c) the characteristic information of surface diffuse reflection light includes tristimulus values for each position of the object.

4. The non-transitory computer-readable recording medium according to claim 1, wherein each of (a) the characteristic information of specular reflection light, (b) the characteristic information of internal diffuse reflection light, and (c) the characteristic information of surface diffuse reflection light includes a reflectance or a luminance for each position of the object.

5. The non-transitory computer-readable recording medium according to claim 1, wherein each of (a) the characteristic information of specular reflection light, (b) the characteristic information of internal diffuse reflection light, and (c) the characteristic information of surface diffuse reflection light is obtained by capturing the object using an imaging apparatus and a polarization filter.

6. The non-transitory computer-readable recording medium according to claim 1, wherein the characteristic information of surface diffuse reflection light is derived based on a surface shape of the object and a refractive index of the object.

7. The non-transitory computer-readable recording medium according to claim 1, wherein the reflection characteristic profile is used by an image forming apparatus that forms an image on a print medium using a color material and a clear material.

* * * * *